US012585414B2

(12) United States Patent
Cherneha et al.

(10) Patent No.: US 12,585,414 B2
(45) Date of Patent: Mar. 24, 2026

(54) METHOD, ELECTRONIC DEVICE, AND STORAGE MEDIUM FOR ADJUSTING DOCUMENT STYLE

(71) Applicant: SAMSUNG ELECTRONICS CO., LTD., Suwon-si (KR)

(72) Inventors: Anastasiia Cherneha, Kyiv (UA); Dmytro Zhelezniakov, Kyiv (UA); Nataliya Sakhnenko, Kyiv (UA); Oleg Yakovchuk, Kyiv (UA); Valentyna Volkova, Kyiv (UA); Tetiana Ignatova, Kyiv (UA); Viktor Zaytsev, Kyiv (UA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 13 days.

(21) Appl. No.: 18/526,901

(22) Filed: Dec. 1, 2023

(65) Prior Publication Data

US 2024/0184494 A1 Jun. 6, 2024

Related U.S. Application Data

(63) Continuation of application No. PCT/KR2023/018388, filed on Nov. 15, 2023.

(30) Foreign Application Priority Data

Dec. 2, 2022 (KR) ........................ 10-2022-0167029

(51) Int. Cl.
*G06F 3/12* (2006.01)

(52) U.S. Cl.
CPC .......... *G06F 3/1243* (2013.01); *G06F 3/1206* (2013.01); *G06F 3/125* (2013.01);
(Continued)

(58) Field of Classification Search
CPC ....... G06F 3/125; G06F 3/1206; G06F 3/1256
See application file for complete search history.

(56) References Cited

U.S. PATENT DOCUMENTS 9,239,820 B1 * 1/2016 Marks ................... G06F 40/106
10,747,945 B2 8/2020 Güngör et al.
(Continued)

FOREIGN PATENT DOCUMENTS

KR 10-2008-0045697 A 5/2008
KR 10-2037179 B1 10/2019
(Continued)

OTHER PUBLICATIONS

Yieldify, "Personalization Technology: Landscape & Trends for 2023", Jul. 7, 2022, 12 pages, url: https://www.yieldify.com/free-guides/personalization-technology/.
(Continued)

*Primary Examiner* — John R Wallace
(74) *Attorney, Agent, or Firm* — Sughrue Mion, PLLC

(57) ABSTRACT

A method of adjusting a document style includes obtaining a target document from a user, obtaining a style reference document; extracting, from the style reference document, document style information representing a document style of the style reference document, adjusting a document style of the target document, based on the document style information and a first external input signal indicating a first document style adjustment level of the target document, and displaying the adjusted target document with the adjusted document style.

18 Claims, 19 Drawing Sheets

(52) U.S. Cl.

CPC .......... G06F 3/1256 (2013.01); G06F 3/1257 (2013.01); G06F 3/1265 (2013.01); G06F 3/1292 (2013.01)

(56) References Cited

U.S. PATENT DOCUMENTS

| | | | |
|---|---|---|---|
| 10,909,657 B1 | 2/2021 | Rossi et al. | |
| 11,651,607 B2 | 5/2023 | Harada | |
| 11,769,072 B2 | 9/2023 | Kraley | |
| 11,960,816 B2 | 4/2024 | Kukla et al. | |
| 11,960,832 B2 | 4/2024 | Begun et al. | |
| 2004/0163048 A1 | 8/2004 | McKnight et al. | |
| 2007/0061714 A1 | 3/2007 | Stuple et al. | |
| 2016/0275053 A1* | 9/2016 | Eicholz | G06F 40/137 |
| 2017/0220545 A1* | 8/2017 | Gururajan | G06F 40/106 |
| 2018/0081519 A1* | 3/2018 | Kim | G06F 3/011 |
| 2018/0082407 A1 | 3/2018 | Rymkowski et al. | |
| 2018/0103213 A1 | 4/2018 | Holzer et al. | |
| 2018/0129633 A1 | 5/2018 | Sun et al. | |
| 2019/0244329 A1 | 8/2019 | Li et al. | |
| 2020/0110797 A1 | 4/2020 | Melnyk et al. | |
| 2020/0356634 A1 | 11/2020 | Srinivasan et al. | |
| 2020/0364303 A1 | 11/2020 | Liu et al. | |
| 2020/0365166 A1 | 11/2020 | Zhang et al. | |
| 2020/0410976 A1 | 12/2020 | Zhou et al. | |
| 2022/0092878 A1 | 3/2022 | Borah et al. | |
| 2022/0138398 A1* | 5/2022 | Wang | G06F 40/103 715/227 |
| 2022/0138402 A1 | 5/2022 | Kraus et al. | |

FOREIGN PATENT DOCUMENTS

| | | |
|---|---|---|
| KR | 10-2020-0052438 A | 5/2020 |
| KR | 10-2021-0099152 A | 8/2021 |
| KR | 10-2022-0044011 A | 4/2022 |
| WO | 2019/025909 A1 | 2/2019 |
| WO | 2020/073758 A1 | 4/2020 |
| WO | 2021/034786 A1 | 2/2021 |
| WO | 2022/066907 A1 | 3/2022 |

OTHER PUBLICATIONS

News Provided by The NPD Group, "Bullet Journaling Trend Lifts Sales of Notebooks and Writing Instruments, Reports The NPD Group", Jun. 27, 2018, 2 pages, url: https://www.prweb.com/releases/bullet_journaling_trend_lifts_sales_of_notebooks_and_writing_instruments_reports_the_npd_group/prweb15590671.htm.

Di Jin et al., "Deep Learning for Text Style Transfer: A Survey", Dec. 16, 2021, 51 pages, arXiv:2011.00416v5 [cs.CL].

Gordicaleksa (Reddit user name), Text Style Brush by Facebook AI—amazing single-shot text style transfer results (deepfakes just got ++), 2020, 1 page, url: https://www.reddit.com/r/deeplearning/comments/nyxb8f/text_style_brush_by_facebook_ai_amazing/?rdt=39275.

Leon A. Gatys et al., "Image Style Transfer Using Convolutional Neural Networks", 2016 IEEE Conference on Computer Vision and Pattern Recognition (CVPR), Jun. 2016, pp. 2414-2423, doi: 10.1109/CVPR.2016.265.

Fujun Luan et al., "Deep Photo Style Transfer", Apr. 11, 2017, 9 pages, arXiv:1703.07511v3 [cs.CV].

Praveen Krishnan et al., "TextStyle Brush: Transfer of Text Aesthetics from a Single Example", Journal of Latex Class Files, vol. 14, No. 8, Aug. 2015, 18 pages, arXiv:2106.08385v1 [cs. CV] (Jun. 15, 2021), url: https://www.reddit.com/r/deeplearning/comments/nyxb8f/text_style_brush_by_facebook_ai_amazing/?rdt=39275.

Jie An et al., "ArtFlow: Unbiased Image Style Transfer via Reversible Neural Flows", Apr. 9, 2021, 23 pages, arXiv:2103.16877v2 [cs.CV].

Zichao Yang et al., "Unsupervised Text Style Transfer using Language Models as Discriminators", 32nd Conference on Neural Information Processing Systems (NeurIPS 2018), Advances in Neural Information Processing Systems, vol. 31, 14 pages, arXiv: 1805.11749v3 [cs.CL] (Jan. 29, 2019).

Yanpeng Zhao et al., "Language Style Transfer from Sentences with Arbitrary Unknown Styles", Aug. 13, 2018, 12 pages, arXiv:1808.04071v1 [cs.CL].

Chenhao Li et al., "Few-shot Font Style Transfer between Different Languages", 2021 IEEE Winter Conference on Applications of Computer Vision (WACV), Jan. 2021, pp. 433-442, doi: 10.1109/WACV48630.2021.00048.

Xide Xia et al., "Real-time Localized Photorealistic Video Style Transfer", Oct. 20, 2020, 16 pages, arXiv:2010.10056v1 [cs.CV].

Yingying Deng et al., "Arbitrary Video Style Transfer via Multi-Channel Correlation", Jan. 20, 2021, 8 pages, arXiv:2009.08003v2 [cs.CV].

Ang Li et al., "MVStylizer: An Efficient Edge-Assisted Video Photorealistic Style Transfer System for Mobile Phones", Jun. 1, 2020, 10 pages, arXiv:2005.11630v2 [eess.IV].

Kaizhi Qian et al., "AUTOVC: Zero-Shot Voice Style Transfer with Only Autoencoder Loss", Jun. 6, 2019, 12 pages, arXiv:1905.05879v2 [eess.AS].

Siyang Yuan et al., "Improving Zero-shot Voice Style Transfer via Disentangled Representation Learning", Published as a conference paper at ICLR 2021, 17 pages, arXiv:2103.09420v1 [eess.AS] (Mar. 17, 2021).

Marco Pasini, "MelGAN-VC: Voice Conversion and Audio Style Transfer on arbitrarily long samples using Spectrograms", Dec. 5, 2019, 8 pages, arXiv:1910.03713v2 [eess.AS].

Wikipedia, "Neural style transfer", Feb. 2019, 2 pages, url: https://en.wikipedia.org/wiki/Neural_style_transfer.

Leon A. Gatys et al., "A Neural Algorithm of Artistic Style", Sep. 2, 2015, 16 pages, arXiv:1508.06576v2 [cs.CV].

Reiichiro Nakano, "Arbitrary Style Transfer in the Browser", 3 pages, Dec. 2018, url: https://reiinakano.github.io/arbitrary-image-stylization-tfjs.

K S Kuppusamy, "The Best Machine Learning Libraries in Julia", Mar. 29, 2019, 6 pages, url: https://www.opensourceforu.com/2019/03/the-best-machine-learning-libraries-in-julia/.

Communication dated Feb. 15, 2024, issued by the International Searching Authority in International Application No. PCT/KR2023/018388 (PCT/ISA/220, PCT/ISA/210, and PCT/ISA/237).

Communication issued on Nov. 24, 2025 by the European Patent Office in European Patent Application No. 23898154.2.

* cited by examiner

FIG. 2

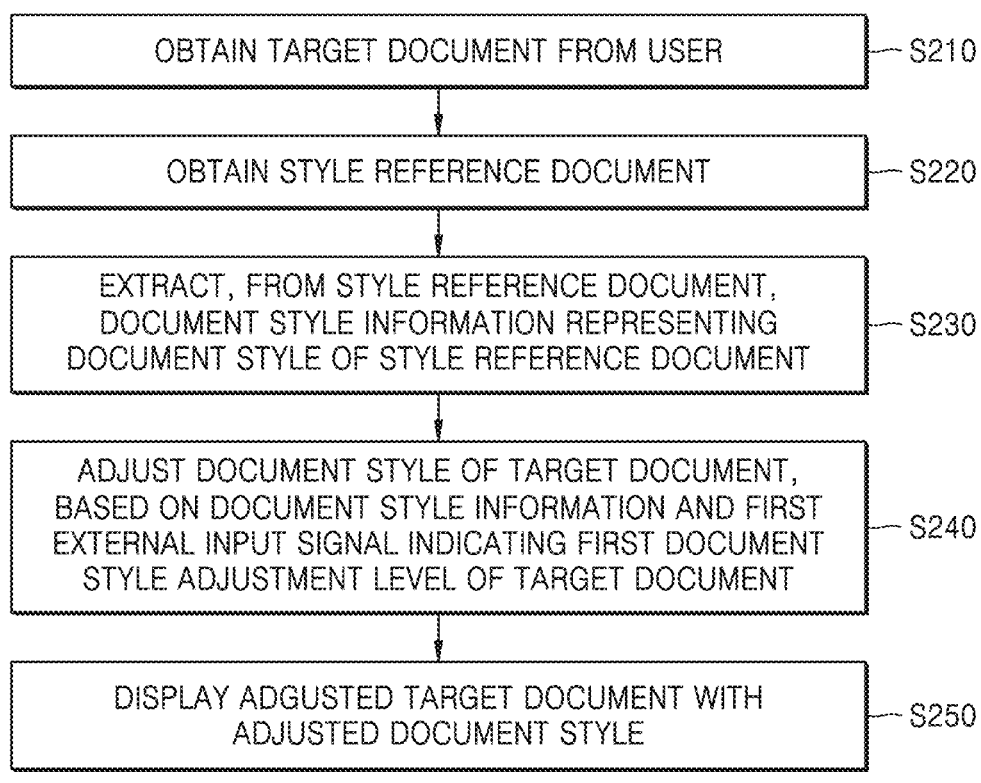

OBTAIN TARGET DOCUMENT FROM USER — S210

OBTAIN STYLE REFERENCE DOCUMENT — S220

EXTRACT, FROM STYLE REFERENCE DOCUMENT, DOCUMENT STYLE INFORMATION REPRESENTING DOCUMENT STYLE OF STYLE REFERENCE DOCUMENT — S230

ADJUST DOCUMENT STYLE OF TARGET DOCUMENT, BASED ON DOCUMENT STYLE INFORMATION AND FIRST EXTERNAL INPUT SIGNAL INDICATING FIRST DOCUMENT STYLE ADJUSTMENT LEVEL OF TARGET DOCUMENT — S240

DISPLAY ADGUSTED TARGET DOCUMENT WITH ADJUSTED DOCUMENT STYLE — S250

FIG. 7

$$(1-\alpha) * \underset{712}{b} + \alpha * \underset{714}{b} = \underset{716}{b}$$

$$\frac{a + a}{2} = a$$

$$\frac{a + a}{2} = a \quad {}_{718}$$

$$\frac{b + b}{2} = b$$

$$\frac{b + b}{2} = b$$

FIG. 10
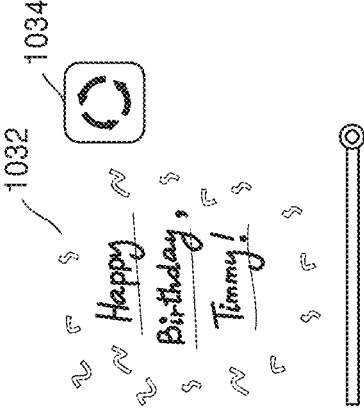
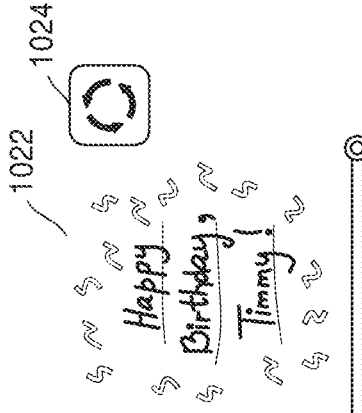
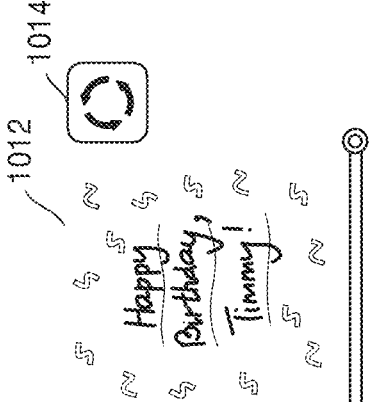

METHOD, ELECTRONIC DEVICE, AND STORAGE MEDIUM FOR ADJUSTING DOCUMENT STYLE

CROSS-REFERENCE TO RELATED APPLICATIONS

This application is a by-pass continuation of International Application No. PCT/KR2023/018388, filed on Nov. 15, 2023, which is based on and claims priority to Korean Patent Application No. 10-2022-0167029, filed on Dec. 2, 2022, in the Korean Intellectual Property Office, the disclosures of which are incorporated by reference herein in their entireties.

BACKGROUND

1. Field

The disclosure relates to a method and electronic device for adjusting a document style for a target document, based on a style reference document.

2. Description of Related Art

Document Analysis and Recognition (DAR) is a technology used to automatically extract information from paper and make it available in a digital format. While most data is now being converted into a computer usable format, a significant amount of information is still recorded, stored, and distributed in paper format. In addition, DAR technology is used to convert a document into a digital format so that data contained in the document may be processed and classified.

An artificial intelligence (AI) system is a computer system that realizes human-level intelligence, and enables machines to learn and make decisions on their own, unlike existing rule-based smart systems. AI technology consists of machine learning (deep learning) and element technologies using machine learning. Machine learning is an algorithmic technology for autonomously classifying/learning features of input data, and element technologies are technologies for simulating functions of a human brain such as cognition, decision-making, etc., by using machine learning algorithms such as deep learning and include technical fields such as linguistic understanding, visual understanding, reasoning/prediction, knowledge representation, motion control, etc. In addition, natural language processing (NLP) may use an AI system to analyze and process the natural human language.

Meanwhile, when an operation of extracting information from a document and converting it into a digital format is performed, design features of the document may disappear. Furthermore, specialized tools and systems are required to style the document, and it may take an extended period of time to do so.

SUMMARY

According to an aspect of the disclosure, a method of adjusting a document style includes: obtaining a target document from a user; obtaining a style reference document; extracting, from the style reference document, document style information representing a document style of the style reference document; adjusting a document style of the target document based on the document style information and a first external input signal indicating a first document style adjustment level of the target document; and displaying the adjusted target document with the adjusted document style.

The method may further include: adjusting the document style of the target document based on the document style information and a second external input signal indicating a second document style adjustment level of the target document different from the first document style adjustment level.

The obtaining the style reference document may include selecting a document from among one or more documents.

The extracting, from the style reference document, the document style information may further include: extracting, from the style reference document, reference document components representing document components in the style reference document by analyzing a layout of the style reference document; extracting, from the style reference document, reference style properties representing style properties associated with the reference document components, and wherein the document style information may include the reference document components and the reference style properties.

The adjusting the document style of the target document may further include: extracting, from the target document, target document components representing document components included in the target document by analyzing the target document; extracting, from the target document, target style properties representing style properties associated with the target document components; and adjusting the document style of the target document based on the document style information, the target document components, the target style properties, and the first external input signal.

The first document style adjustment level may include at least one of an adjustment level corresponding to each component of the target document components, an adjustment level corresponding to an adjustable style property of each component of the target document components, or an overall adjustment level corresponding to general adjustments to the style of the target document.

The extracting the document style information may be performed based on a rule-based method or machine learning.

The obtaining the style reference document may include selecting a plurality of documents from among one or more documents.

The method may further include: based on receiving a resetting external input, resetting the document style for the target document, wherein receiving the resetting external input does not change the first document style adjustment level.

The extracting, from the style reference document, the document style information may further include extracting the document style information from a part of the style reference document.

The adjusting the document style for the target document may be performed by using at least one of a neural network, a clustering algorithm, or a geometric approach.

The adjusted target document with the adjusted document style may be displayed as augmented reality (AR) content or virtual reality (VR) content.

According to an aspect of the disclosure, an electronic device includes: at least one display; at least one memory storing at least one instruction; and at least one processor configured to execute the at least one instruction to: obtain a target document from a user, obtain a style reference document, extract, from the style reference document, document style information representing a document style of the style reference document, adjust a document style of the target document based on the document style information and a first external input signal indicating a first document style adjustment level of the target document, and display the adjusted target document with the adjusted document style.

The at least one processor of the electronic device may be further configured to execute the at least one instruction to: adjust the document style of the target document based on the document style information and a second external input signal indicating a second document style adjustment level of the target document different from the first document style adjustment level.

The at least one processor of the electronic device may be further configured to execute the at least one instruction to obtain the style reference document by selecting a document from among one or more documents.

The at least one processor of the electronic device may be further configured to execute the at least one instruction to: extract, from the style reference document, reference document components representing document components in the style reference document by analyzing a layout of the style reference document, extract, from the style reference document, reference style properties representing style properties associated with the reference document components, and wherein the document style information may include the reference document components and the reference style properties.

The at least one processor of the electronic device may be further configured to execute the at least one instruction to: extract, from the target document, target document components representing document components included in the target document by analyzing the target document, extract, from the target document, target style properties representing style properties associated with the target document components, and adjust the document style of the target document based on the document style information, the target document components, the target style properties, and the first external input signal.

The at least one processor of the electronic device may be further configured to execute the at least one instruction to extract the document style information using a rule-based method or machine learning.

The at least one processor may be further configured to execute the at least one instruction to adjust the document style of the target document using at least one of a neural network, a clustering algorithm, or a geometric approach.

According to an aspect of the disclosure, a non-transitory computer readable medium having instructions stored therein, which when executed by at least one processor cause the at least one processor to execute a method of adjusting a document style, where the method includes: obtaining a target document from a user; obtaining a style reference document; extracting, from the style reference document, document style information representing a document style of the style reference document; adjusting a document style of the target document based on the document style information and a first external input signal indicating a first document style adjustment level of the target document; and displaying the adjusted target document with the adjusted document style.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 is a flowchart of a method, performed by an electronic device, of adjusting a document style, according to an embodiment of the disclosure;

FIG. 7 illustrates a specific example of a method of adjusting style properties associated with text, according to an embodiment of the disclosure;

FIG. 10 illustrates a method of resetting adjustable style properties in relation to adjustment of style properties, according to an embodiment of the disclosure;

FIG. 17 is a structure diagram for document components and style properties associated therewith, according to an embodiment of the disclosure.

DETAILED DISCLOSURE

Figure 1:
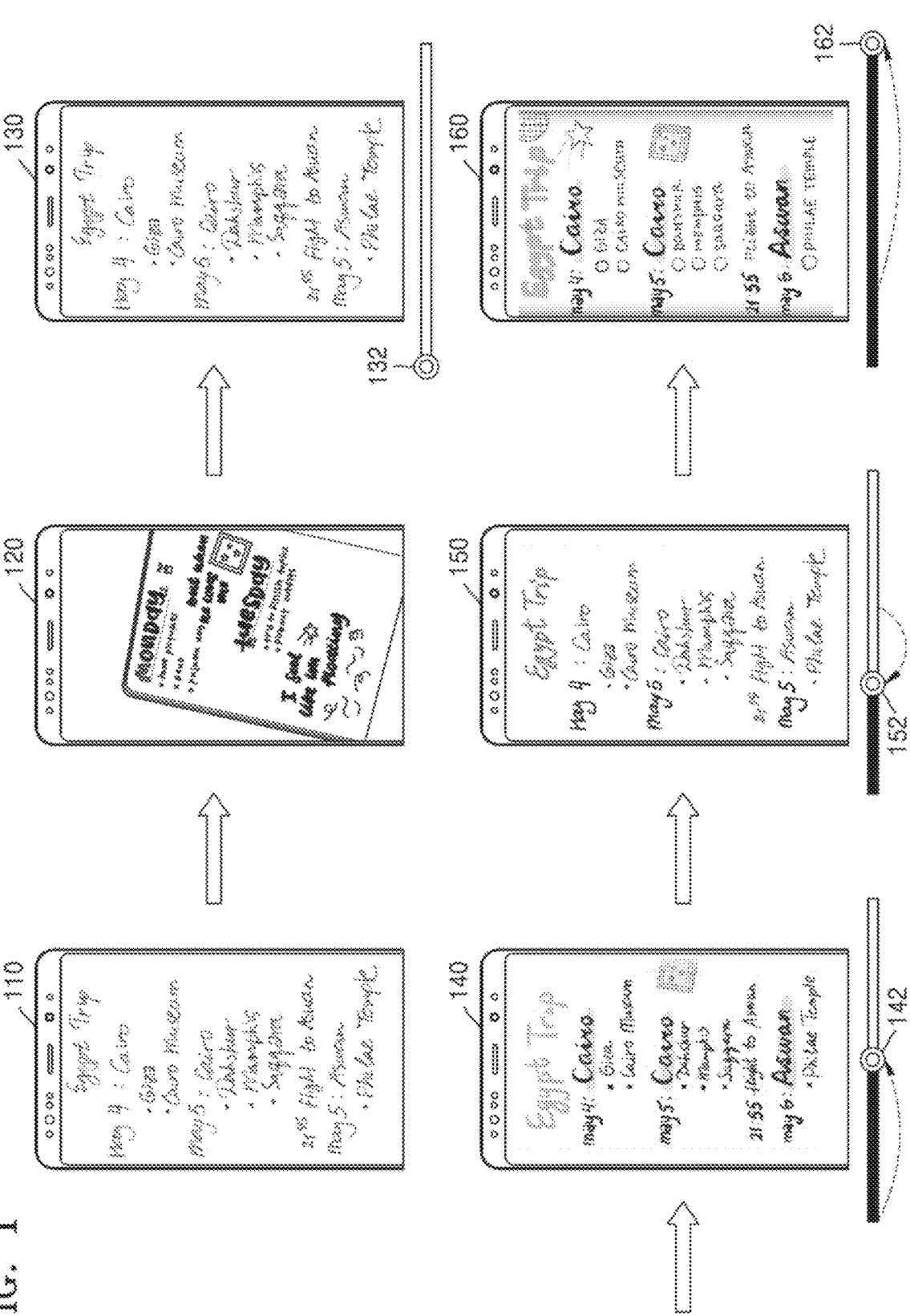
FIG. 1 illustrates an operation in which an electronic device adjusts a document style, according to an embodiment of the disclosure.

Throughout the disclosure, the expression "at least one of a, b or c" indicates only a, only b, only c, both a and b, both a and c, both b and c, all of a, b, and c, or variations thereof.

Advantages and features of the disclosure and methods of accomplishing the same will be more readily appreciated by referring to the following description of embodiments of the disclosure and the accompanying drawings. However, the disclosure should not be construed as being limited to embodiments of the disclosure set forth below but may be embodied in many different forms. Rather, the present embodiments of the disclosure are provided so that the disclosure will be thorough and complete and will fully convey the concept of the disclosure to those of ordinary skill in the art, and the disclosure will only be defined by the appended claims.

The terms used in the disclosure are general terms currently widely used in the art based on functions described in the disclosure, but may be changed according to an intention of a technician engaged in the art, precedent cases, advent of new technologies, etc. Furthermore, specific terms may be arbitrarily selected by the applicant, and in this case, the meaning of the selected terms will be described in detail in the detailed description of the disclosure. Thus, the terms used herein should be defined not by simple appellations thereof but based on the meaning of the terms together with the overall description of the disclosure.

Terms used in the disclosure are only used to describe a particular embodiment of the disclosure and are not intended to limit the disclosure. Singular expressions used herein are intended to include plural expressions as well unless the context clearly indicates otherwise. All the terms used herein, which include technical or scientific terms, may have the same meaning that is generally understood by a person of ordinary skill in the art. Furthermore, although the terms including an ordinal number such as "first", "second", etc. may be used herein to describe various elements or components, these elements or components should not be limited by the terms. The terms are only used to distinguish one element or component from another element or component.

The use of the terms "the" and similar referents used in the specification, especially in the following claims, are to be construed to cover both the singular and the plural. Furthermore, operations of a method according to the disclosure described herein may be performed in any suitable order unless clearly specified herein. The disclosure is not limited to the described order of the operations.

Expressions such as "in some embodiments of the disclosure" or "in an embodiment of the disclosure" described in various parts of this specification do not necessarily refer to the same embodiment(s) of the disclosure.

Some embodiments of the disclosure may be described in terms of functional block components and various processing operations. Some or all of such functional blocks may be implemented by any number of hardware and/or software components that execute specific functions. For example, functional blocks of the disclosure may be implemented by one or more microprocessors or by circuit components for performing predetermined functions. Furthermore, functional blocks according to the disclosure may be implemented with various programming or scripting languages. The functional blocks may be implemented using various algorithms executed on one or more processors. Furthermore, the disclosure may employ techniques of the related art for electronics configuration, signal processing, and/or data processing. The terms such as "mechanism", "element", "means", and "construction" may be used in a broad sense and are not limited to mechanical or physical components.

Furthermore, connecting lines or connectors shown in various figures are intended to represent exemplary functional connections and/or physical or logical couplings between components in the figures. In an actual device, connections between components may be represented by many alternative or additional functional relationships, physical connections, or logical connections.

Throughout the specification, when a part "includes" or "comprises" an element, unless there is a particular description contrary thereto, it is understood that the part may further include other elements, not excluding the other elements. As used herein, the term "unit" denotes a software element or a hardware element such as a field-programmable gate array (FPGA) or an application-specific integrated circuit (ASIC), and performs certain functions. However, the term "unit" is not limited to software or hardware. The "unit" may be formed so as to be in an addressable storage medium, or may be formed so as to operate one or more processors. Thus, in an example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units".

An embodiment of the disclosure will now be described more fully hereinafter with reference to the accompanying drawings so that it may be easily implemented by one of ordinary skill in the art. In addition, in the drawings, parts not related to descriptions of the disclosure are omitted to clearly explain the disclosure.

In the specification, a "document style" may include components in a document and style properties associated with the components in the document. For example, components in a document may include at least one of a text, a table, a chart, a diagram, or a background. For example, style properties associated with a text among components in a document may include at least one of a text's size, font, color, typography effect, brush type, or special decoration.

As used herein, a "target document" may refer to a document obtained from a user and for which the user wants to adjust a style. A target document may be obtained in the form of capture, scan, or a digital document. A digital document contains data in document format that an electronic device transmits, receives, or stores, and may include a document created within an electronic device by using a digital pen. Moreover, a method of obtaining a document is not limited to that described herein.

As used herein, a "style reference document" may mean a document referred to for adjusting a target document. Specifically, a target document may be adjusted by extracting document style information related to a document style for a style reference document.

As used herein, an "external input" is a signal input to an electronic device in the process of adjusting a document style for a target document, and is a signal obtained from a user of the electronic device. The external input may be obtained in the form of a touch input or voice input to a display of the electronic device, but is not limited thereto. The external input may include a first external input signal, a second external input signal, a first resetting external input, a second resetting external input, and a third resetting external input.

FIG. 1 is a diagram illustrating an operation in which an electronic device adjusts a document style, according to an embodiment of the disclosure.

In an embodiment of the disclosure, the electronic device may perform document style adjustment. The electronic device may obtain a target document 110 from a user. The electronic device may obtain, from the user, a photo, a scanned document, a digital document, or the like as the target document 110.

In an embodiment of the disclosure, the electronic device may obtain a style reference document 120 for use in adjusting a style of the target document 110. For example, the style reference document 120 may be a document prestored in an electronic device, a document received via a server, or a document input by the user as a photo, a scanned document, or a digital document. In addition, a completed form of document may be received as the style reference document 120 and used to adjust the style of the target document 110. A document created or edited using a digital pen in the electronic device may be obtained as the style reference document 120 and used to adjust the document style for the target document 110.

In an embodiment of the disclosure, the electronic device may display a slider on a display, and the user may move a scroll on a slider to change a style adjustment level.

In an embodiment of the disclosure, a first document style 130 may correspond to a document displayed when the scroll is located at a first point 132 in the slider. Also, a second document style 140 may correspond to a document displayed when the scroll is moved to the right of the first point 132 by a specified length and located at a second point 142. A third document style 150 may correspond to a document displayed when the scroll is moved to the left of the second point 142 and located at a third point 152. A fourth document style 160 may correspond to a document displayed when the scroll is positioned at a fourth point 162 that is located to the right of the second point 142.

In an embodiment of the disclosure, the first point 132 may refer to a leftmost point in the slider. When arranged in order from the first point 132, the points may be the third point 152, the second point 142, and the fourth point 162.

In an embodiment of the disclosure, the electronic device may extract document style information from the style reference document 120. For example, among texts included in the style reference document 120, width data regarding a handwritten header text may be extracted. As seen in the style reference document 120, a width of the header text in the style reference document 120 is larger than a width of a header text in the target document 110. Information related to a text width may be included in the document style information.

In an embodiment of the disclosure, considering the information related to the width of the handwritten header text of the target document (hereinafter, referred to as text width information), among the first to fourth document styles, the width of the header text for the fourth document style 160 at the fourth point 162 of the scroll is largest. A header text width for the second document style 140 at the second point 142 where the scroll on the slider is located to the left of the fourth point 162 is smaller than the header text width for the fourth document style 160. A header text width for the third document style 150 at the third point 152 where the scroll is located to the left of the second point 142 is smaller than the header text width for the second document style 140. A header text width for the first document style 130 at the first point 132 where the scroll is located to the left of the third point 152 is smaller than the header text width for the third document style 150.

In an embodiment of the disclosure, text underline data, which is a style property associated with text included in the style reference document 120, may be obtained. While a text underline does not exist in the target document 110, some texts in the style reference document 120 include text underlines.

In an embodiment of the disclosure, the second document style 140 and the fourth document style 160, where the scroll is respectively centered and located to the right of a center on the slider, include text underlines similar to underlines of texts in the style reference document 120. However, the first document style 130 and the third document style 150 where the scroll is located to the left of the center on the slider do not include text underlines.

Moreover, style adjustment for the target document 110 is performed by comprehensively taking into account document components and style properties of the target document 110 and the style reference document 120, and is not limited to the presented examples.

In an embodiment of the disclosure, as the scroll on the slider is located further to the right, the target document 110 may have more similar style properties to the style reference document 120. For example, the adjusted target document with the adjusted document style may have style properties for a background, a text, a table, a chart, a diagram, etc. that are included in a style reference document.

In an embodiment of the disclosure, the disclosure provides a method of designing a document more easily and quickly by allowing variable adjustments to a target document based on a style reference document.

In an embodiment of the disclosure, the disclosure may use the field of computer vision. In particular, in the field of computer vision, fields of image processing and document analysis and recognition (DAR) may be mainly used.

In an embodiment of the disclosure, image processing may include image style transfer and stroke style transformation techniques. In addition, one-shot learning, which is used in image style transfer, may be performed to predict which object belongs to which category by using a pretrained model. For example, when document style adjustment is performed using only image style transfer, a problem may occur in that the style transfer is performed on the entire image without an understanding of a target document. To solve the problem, the image style transfer may be applied only to some operations for the disclosure. For example, the image style transfer may be used for extracting document components in a style reference document or target document and extracting or classifying style properties associated with the document components. For example, stroke style transformation may be used to recognize text and adjust a font of the text, etc.

In an embodiment of the disclosure, DAR is a field that aims to automatically extract information that is able to be understood by humans from a document containing text and the like, and to process the extracted information so that it is suitable for processing by a computer. The DAR may include online recognition (pen-based), offline recognition (optical/camera based), page layout analysis, and table/diagram extraction. When document style adjustment is performed by using only online recognition or offline recognition, there is a possibility that only information related to text, tables, diagrams, or layouts may be obtained, and information related to styles may be lost and thus, style-related information is not available for use. However, in an embodiment of the disclosure, the information related to the document style components may be used. The DAR may be applied only to some operations for the disclosure. For example, the DAR may be used to extract components in a document and the content of the document.

The field of AI includes the field of natural language processing (NLP), and information classification may be performed through NLP.

The field of human-computer interaction (HCI) may include a field of interaction techniques. For example, interaction techniques allow a user to perform a specific operation using a combination of hardware and software, e.g., by clicking a button, pressing a key, performing a mouse gesture, or inputting a voice command via a user interface or the like.

Interaction techniques may be performed using a mouse and a keyboard, a pen or stylus, a camera, etc. Adjusting a document style using only a pen or a stylus requires a lot of time and effort, and adjusting a document style by using only a camera may not allow reuse of styles and require high level of drawing skills or the like. However, the interaction techniques may be applicable to only some operations for the disclosure. For example, a mouse and a keyboard may be used to obtain external inputs, and a document written using a pen or stylus may be used for the disclosure. Also, the camera may be used to obtain a style reference document or a target document.

That is, document style adjustment may be performed by appropriately using at least one technical field, i.e., at least one of image processing, DAR, NLP, or an interaction technique. In addition, according to the disclosure, document style adjustment is performed based on an understanding of not only the content of the document but also the overall style of the document, such as handwriting of text and characteristics of images.

FIG. 2 is a flowchart of a method, performed by an electronic device, of adjusting a document style, according to an embodiment of the disclosure.

In operation S210, the electronic device obtains a target document from a user.

In an embodiment of the disclosure, the electronic device obtains, from the user, a target document whose document style is to be adjusted. The target document may be obtained from the user in the form of a scan, image capture, or digital document, and a method of obtaining the target document is not limited to the stated examples.

In operation S220, the electronic device obtains a style reference document for use in adjusting a document style for the target document.

In an embodiment of the disclosure, the electronic device obtains a style reference document to refer to for adjusting the document style for the target document. The style reference document may be one document or a plurality of documents selected based on an external input. The style reference document may be at least one of a document obtained from the user, a document prestored in the electronic device, or a document obtained via a server, and a way of obtaining the style reference document is not limited thereto.

In an embodiment of the disclosure, the external input may be a user's touch input via a display or a voice command. Also, the external input may be an input requesting a data-based recommendation. The external input is not limited to the stated examples.

In an embodiment of the disclosure, the style reference document may be a document selected from among one or more documents based on an external input, or may be some documents selected from among a plurality of documents.

In operation S230, the electronic device extracts, from the style reference document, document style information representing a document style for the style reference document for use in adjusting the style of the target document.

In an embodiment of the disclosure, the electronic device extracts document style information from the style reference document. For example, the electronic device may extract document component in a style reference document (also referred to as a "reference document component") and in detail, extract style properties associated with the document component (also referred to as "reference style properties"). Also, information including document components and style properties in the style reference document may be referred to as document style information.

In an embodiment of the disclosure, document components are a set of components having different properties, which may be included in the document, and may include at least one of a text, a table, a chart, a diagram, or a background.

In an embodiment of the disclosure, style properties refer to adjustable design features for elements included in the document component. For example, style properties associated with the text may include at least one of a text's size, font, color, typographic effect, brush type, special decoration, or other style properties of the text. Style properties associated with a table may include at least one of a size of a text contained in the table, a font of the text, a cell color, a border color, a border width, or other style properties of the table. Style properties associated with a chart may include at least one of a size of caption text contained in the chart, a font of the caption text, elements of the chart, colors of the elements, textures of the elements, a border color of the elements, a border width of the elements, or other style properties of the chart. Style properties associated with a diagram may include at least one of a size of text contained in the diagram, a font of the text, elements of the diagram, color of the elements, a border width of the elements, a border color of the elements, or other style properties of the diagram. Style properties associated with a background may include at least one of a background color, a background decoration, a separator, or other style properties of the background.

In an embodiment of the disclosure, there may be style metadata obtained by classifying information related to a document style according to predetermined rules. Style metadata refers to structured data associated with styles of various documents including the style reference document or target document. The style metadata may be generated according to predetermined rules. For example, style metadata may be structured data about style properties for each document component, but is not limited thereto. The document style information obtained from the style reference document may be included in the style metadata, which may be referred to as extended style metadata.

In an embodiment of the disclosure, a document layout or document components may be obtained through analysis of the style reference document. To extract style properties associated with components in a style reference document, available data may be obtained from the style metadata or extended style metadata. Style properties may include basic style properties and additional style properties. The basic style properties may include data about a text's color, font, letter spacing, etc. The additional style properties may refer to style properties whose probability of being included in the document is less than or equal to a threshold, and may be at least one of doodles in a background, a decoration on a header in a text, a decoration on date data, a separator, or a list marker, but is not limited thereto.

In an embodiment of the disclosure, the document style information may be extracted from the entire or a part of the style reference document. For example, document style information may be extracted from the style reference document by extracting document style information for the entire style reference document when there is no additional external input or extracting document style information for a part of the style reference document only when there is an additional external input.

In an embodiment of the disclosure, the document style information including the reference document components and the reference style properties may be obtained or extracted based on a rule-based method or machine learning.

In operation S240, the electronic device adjusts the document style for the target document, based on the document style information and a first external input signal indicating a first document style adjustment level of target document.

In an embodiment of the disclosure, the electronic device may receive a first external input signal indicating a first style adjustment level for the target document. Furthermore, the electronic device may adjust the style of the target document, based on the document style information and the first external input signal.

In an embodiment of the disclosure, the first external input signal refers to an external input signal indicating a document style adjustment level for adjusting the style of the target document. The first external input signal may indicate a style adjustment level for the entire document style, or a style adjustment level for some components in the document or some style properties of the document.

In an embodiment of the disclosure, the first external input signal may be a user's touch input via the display or a voice command. Also, the first external input signal may be an input requesting a data-based recommendation for a style adjustment. The first external input signal is not limited to the described examples.

In an embodiment of the disclosure, the electronic device may extract a document component in the target document (also referred to as a "target document component") and style properties associated with the target document component (also referred to as "target style properties"). And the document style adjustment may be performed based on the target document components and target style properties. Meanwhile, detailed descriptions of the target document components and target style properties are omitted because they correspond to specific descriptions of reference document components and reference style properties only with differences in what role each document plays.

In an embodiment of the disclosure, when a reference document component corresponding to a target document component does not exist, a style for the corresponding component may be derived from a style for another reference document component. For example, when the target document does not include a chart but the style reference document includes a chart, a text included in the chart in the target document may be adjusted by taking into account a text included in a table in the style reference document.

In an embodiment of the disclosure, in adjusting the document style, document components may be adjusted appropriately to avoid overlapping each other. In addition, adjustment may be performed by considering that document components in the target document may have the same or similar styles with a high probability.

In an embodiment of the disclosure, the electronic device may perform style adjustments on the target document over a plurality of times. For example, the electronic device may obtain a second external input signal indicating a second document style adjustment level of the target document. In the disclosure, the second external input signal refers to an external input signal indicating a second document style adjustment level for adjusting the document style for the target document. The second external input signal may indicate a style adjustment level for the entire document style, or a style adjustment level for some components in the document or some style properties of the document. Furthermore, the second external input signal may be a user's touch input via the display, a voice command, or an input requesting a data-based recommendation for a style adjustment. The second external input signal is not limited to the described examples. The document style may be adjusted based on the document style information and the second external input signal indicating a document style adjustment level, and the document style adjustment level of the second external input signal may be different from the document style adjustment level of the first external input signal.

In an embodiment of the disclosure, in order to adjust the document style for the target document, the target document may be analyzed, target document components representing document components included in the target document may be extracted, and target style properties representing design features associated with the target document components may be extracted. Furthermore, the document style for the target document may be adjusted based on the document style information including the reference document components and the reference style properties, the target document components, the target style properties, and at least one external input signal.

In an embodiment of the disclosure, the target document components and the target style properties may be obtained or extracted based on a rule-based method or machine learning. Furthermore, the document style for the target document may be adjusted by using a neural network, a clustering algorithm, and a geometric approach.

In operation S250, the electronic device displays the adjusted target document with the adjusted document style.

In an embodiment of the disclosure, the electronic device may display, on the display of the electronic device, the target document whose style is adjusted based on the first external input signal or the second external input signal.

Figure 3:
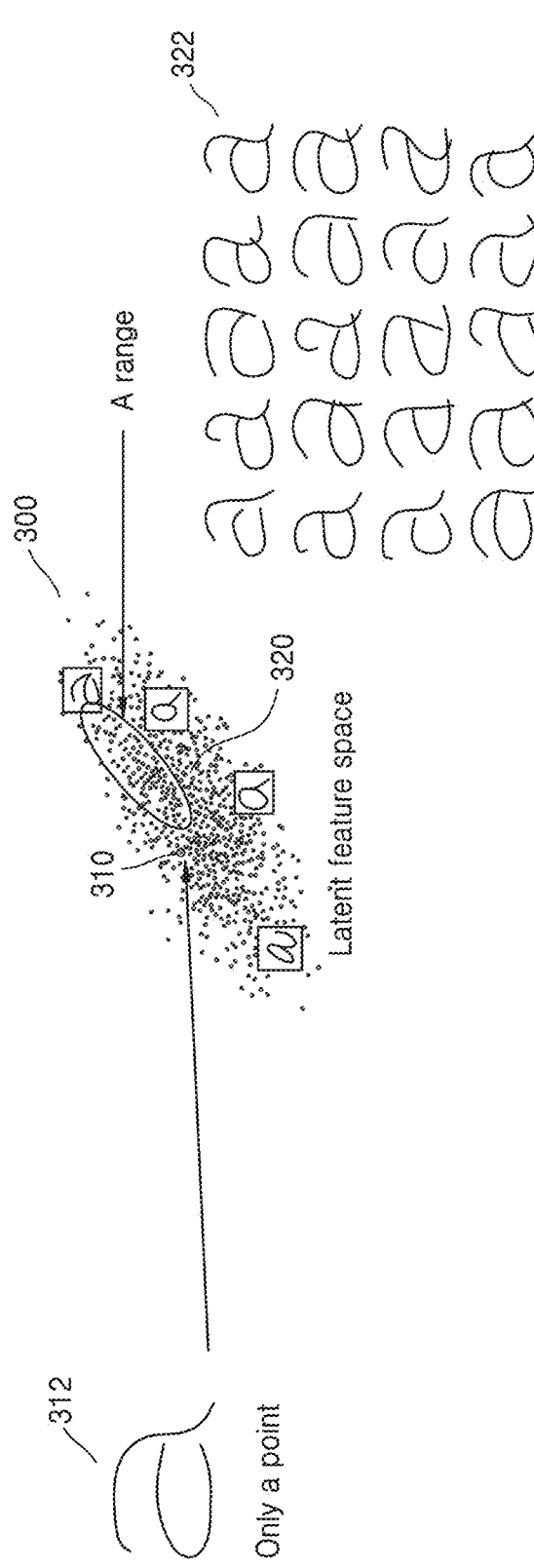
FIG. 3 illustrates a cluster of style properties for a document component, according to an embodiment of the disclosure.

FIG. 3 illustrates a cluster of style properties for a component in a document, according to an embodiment of the disclosure.

In an embodiment of the disclosure, document style adjustment may be performed using a clustering algorithm. For example, a document component may have an style property associated with the document component, and properties similar to a particular style property may be represented as a cluster. A handwriting cluster 300 is a style property associated with a text and may be a set of similar handwriting characters. For convenience of description, an example in which a document component is a handwritten text, and a style property is associated with the handwritten text is described, but the disclosure is not limited thereto, and other document components or other style properties may be provided through a clustering algorithm.

In an embodiment of the disclosure, the handwriting cluster 300 may include several handwriting styles for a letter "a". In the related art, when performing document style adjustment, one style adjustment method is provided. For example, only a point 310 in the handwriting cluster 300 is selected, and a style adjustment method based on a handwriting style 312 corresponding to the point 310 in the handwriting cluster 300 is provided. However, in the disclosure, a subset 320 including only a portion of the handwriting cluster 300 may be selected, and a style adjustment method based on a plurality of handwriting styles 322 corresponding to the subset 320 within the handwriting cluster 300 may be provided. Furthermore, not only one style property but also all style properties for the document components may be adjusted to have the same style adjustment level.

Figure 4:
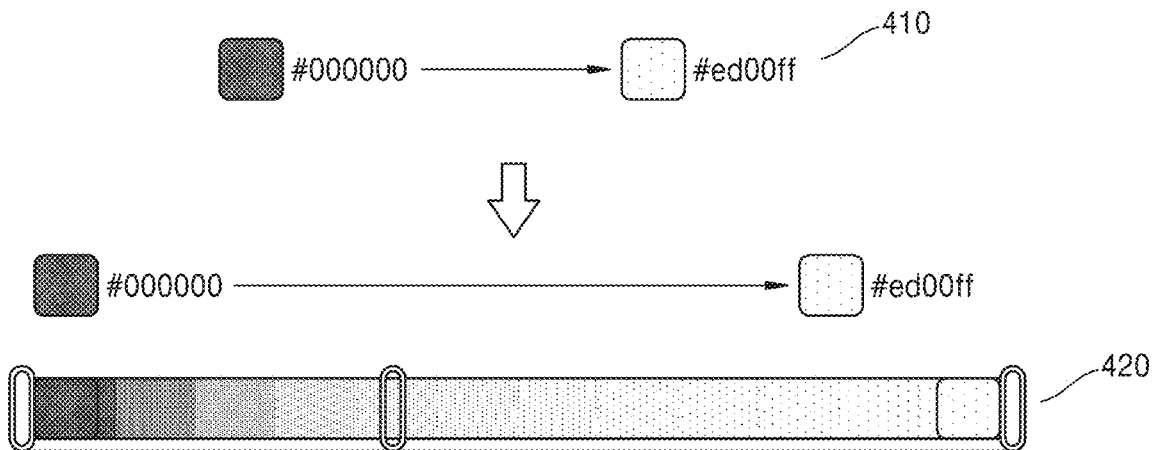
FIG. 4 illustrates a method of linearly adjusting a style property for a document component, according to an embodiment of the disclosure.

FIG. 4 illustrates a method of linearly adjusting a style property for a document component, according to one embodiment of the disclosure.

In an embodiment of the disclosure, document components such as a text, a background, etc. may have color as a style property. For example, colors may be used for text color and background color, etc. Although a text color is described as an example for convenience, the disclosure is not limited to the text color, and other document components or other style properties may be provided through a linear approach. Furthermore, not only one style property but also all style properties may be adjusted to have the same style adjustment level.

In an embodiment of the disclosure, a text color for a target document is black, and a text color for a style reference document may be a color with a color code of "ed00ff". In the related art, only a single color 410 is provided when performing document style adjustment. For example, only a color with the color code of "ed00ff" is provided which is the text color for the style reference document to be referenced. However, in an embodiment of the disclosure, a color range 420 from black with a color code of "000000" to a color with the color code of "ed00ff" may be provided.

In an embodiment of the disclosure, a style adjustment level may be selected from the provided color range 420 based on a first external input signal or a second external input signal.

Figure 5:
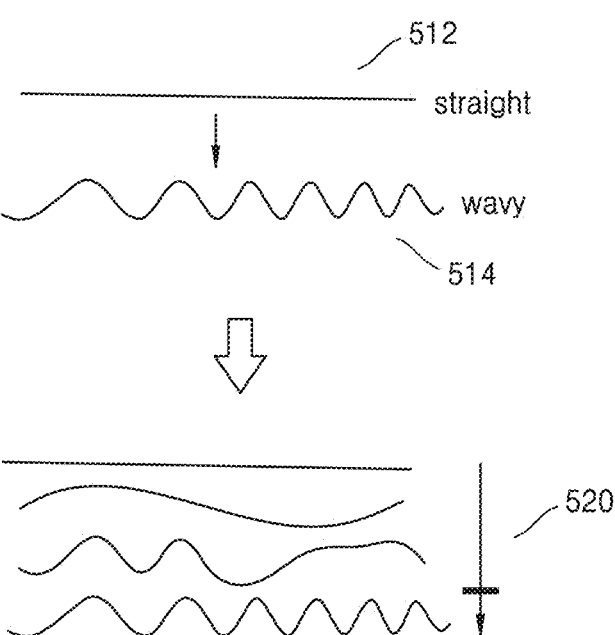
FIG. 5 illustrates a method of linearly adjusting a style property for a document component, according to an embodiment of the disclosure.

FIG. 5 illustrates a method of linearly adjusting a style property for a document component, according to an embodiment of the disclosure.

In an embodiment of the disclosure, among document components, text and the like may have an underline accent shape as a style property. Although an underline accent shape for a text is described as an example for convenience, the disclosure is not limited to the underline accent shape for the text, and other document components or other style properties may be provided through a linear approach. Furthermore, not only one style property but also all style properties may be adjusted to have the same style adjustment level.

In an embodiment of the disclosure, an underline accent shape 512 for the text in a target document may be a straight line, and an underline accent shape 514 for a text in a style reference document may be a wavy line. In the related art, when performing document style adjustment, only one underline accent shape identical to the underline accent shape 514 for the text included in the style reference document may be provided for style adjustment. However, in the disclosure, an underline accent shape range 520 for the text may be provided by generally taking into account a shape of the wavy line, the number of oscillations, a width of oscillations, etc.

In an embodiment of the disclosure, a style adjustment level may be selected from the underline accent shape range 520 for the text, based on a first external input signal or a second external input signal.

Furthermore, in an embodiment of the disclosure, when performing style adjustments using a linear approach, for a straight line connecting a style property for the target document and a style property for the style reference document, an adjusted style property may be a point on the straight line, which may be a point of internal division, a point of external division, a point representing the style property for the target document, or a point representing the style property for the style reference document.

Figure 6:
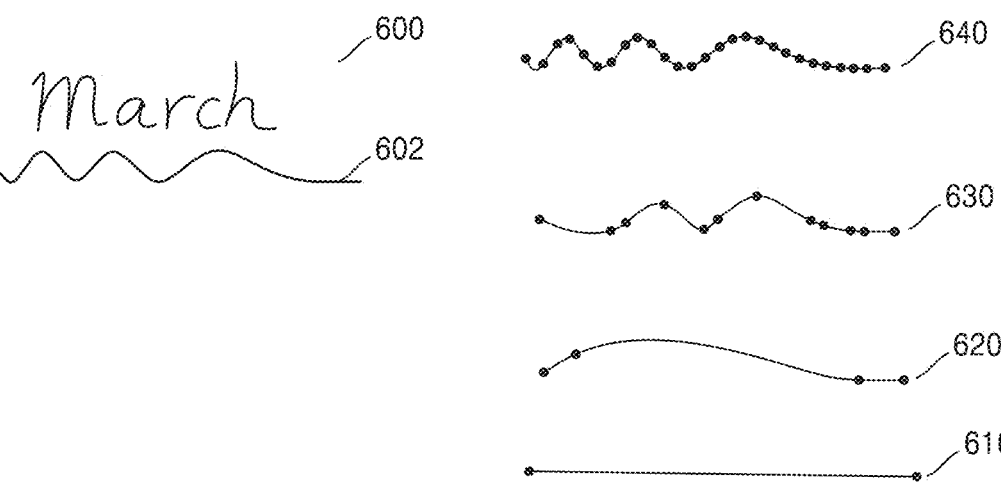
FIG. 6 illustrates specific operations in a method of linearly adjusting a style property for a document component, according to an embodiment of the disclosure.

FIG. 6 illustrates specific operations in a method of linearly adjusting a style property for a document component, according to an embodiment of the disclosure.

In an embodiment of the disclosure, among document components, a text 610 and the like may have an underline accent shape as a style property. Although an underline accent shape for a text is described as an example for convenience, the disclosure is not limited to the underline accent shape for the text, and other document components or other style properties may be provided through a linear approach.

In an embodiment of the disclosure, a text 600 included in a style reference document may have an underline accent shape 602. To provide a range of underline accent shapes similar to the underline accent shape 602 included in the style reference document, a plurality of points may be included in an underline accent shape 640 in the style reference document. By performing interpolation using a plurality of points, a document style for a target document may be adjusted. Meanwhile, a sufficient number of a plurality of points need to be included in an underline accent shape to draw an underline accent similar to the shape of an underline accent included in the style reference document when adjusting a target document style by performing interpolation using a plurality of points. For convenience of description, the underline accent shape 640 included in the style reference document is referred to as a second underline accent shape 640.

In an embodiment of the disclosure, a text in the target document may have a straight underline accent shape. For convenience of description, the text in the target document is referred to as a first underline accent shape 610. For example, when the first underline accent shape 610 is a straight line, the first underline accent shape 610 may be represented using at least two points.

In an embodiment of the disclosure, the target document may be adjusted based on the style reference document. The first underline accent shape 610 may be adjusted by selecting only some of the plurality of points included in the style reference document, and as the number of points in an underline accent shape in the target document becomes closer to the number of points included in the second underline accent shape 640, an underline accent shape more similar to the second underline accent shape 640 may be obtained.

In an embodiment of the disclosure, as seen on FIG. 6, the number of points included in a second middle underline accent shape 630 is greater than that of a first middle underline accent shape 620, and the second middle underline accent shape 630 is more similar to the second underline accent shape 640 than the first middle underline accent shape 620.

Furthermore, in an embodiment of the disclosure, when performing style adjustments using a linear approach, for a straight line connecting a style property for the target document and a style property for the style reference document, an adjusted style property may be a point on the straight line, which may be a point of internal division, a point of external division, a point representing the style property for the target document, or a point representing the style property for the style reference document.

FIG. 7 illustrates a specific example of a method of adjusting style properties associated with text, according to an embodiment of the disclosure.

In an embodiment of the disclosure, handwriting may be adjusted through an allograph trace using dynamic time warping (DTW). An allograph is used for categorizing the shapes of a character by analyzing similar series of characters.

In an embodiment of the disclosure, output handwriting 716 may be obtained by applying DTW to first handwriting 712 (hereinafter referred to as target handwriting) of a text included in the target document and second handwriting 714 (hereinafter referred to as reference handwriting) of a text included in the style reference document. In detail, the output handwriting 716 may be obtained by multiplying the first handwriting 712 by a value of "1−α" and adding, to the resulting product, a product of the second handwriting 714 and a correlation coefficient "α". In this case, the correlation coefficient "α" is an arbitrary value between 0 and 1, and a value of "α" may be adjusted based on an external input signal.

In an embodiment of the disclosure, DTW may be used to compare each pair of closest points by comparing target handwriting with reference handwriting, and obtain an appropriate output handwriting depending on the value of "α", and when the value of "α" is 0.5, a set of intermediate points that are located between each pair of closest points in the target handwriting and the reference handwriting may be obtained as output handwriting 718.

Although style properties associated with text are described as an example for convenience, such adjustment may be applied to other document components or other style properties.

Figure 8:
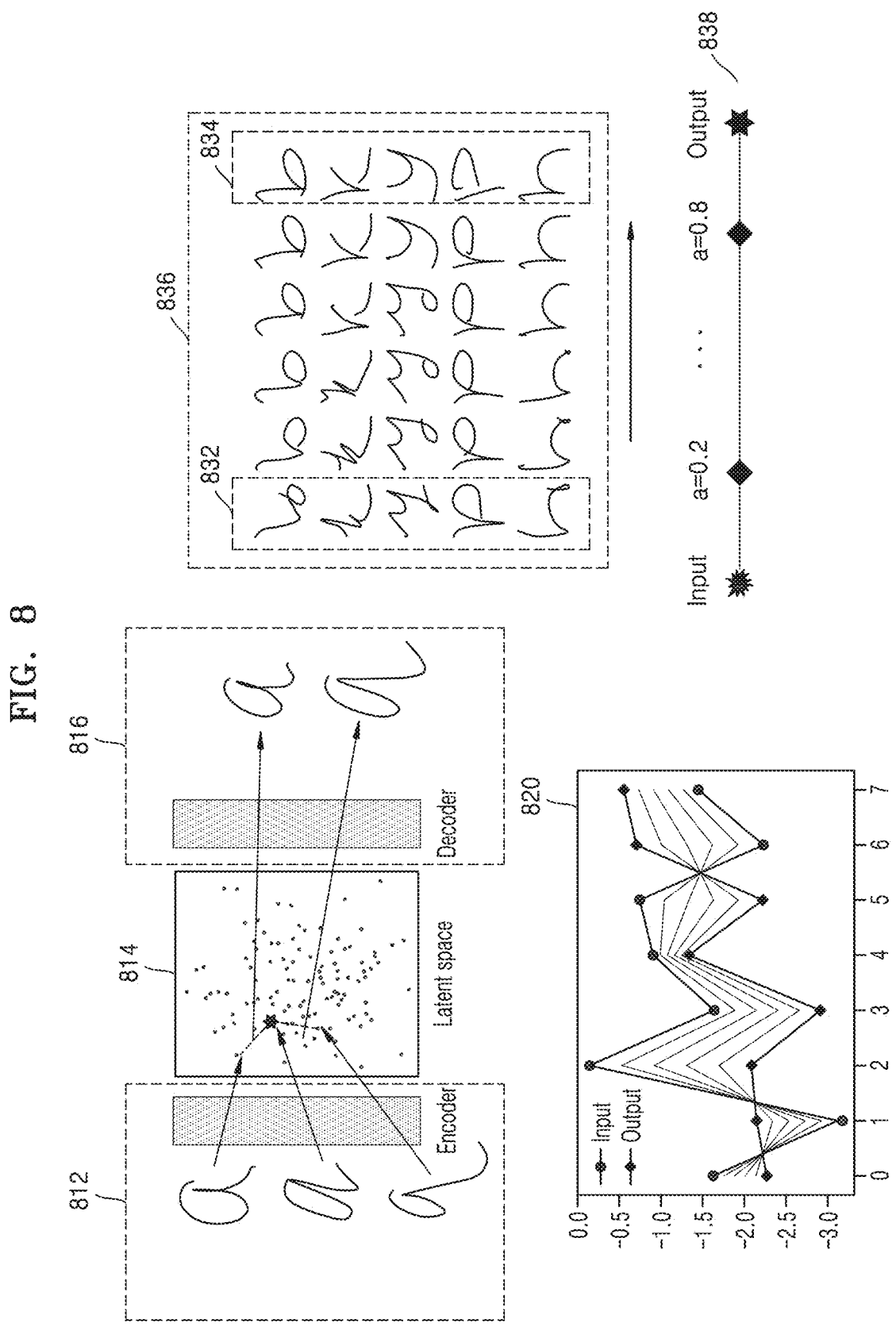
FIG. 8 illustrates a specific example of a method of adjusting style properties associated with text, according to an embodiment of the disclosure.

FIG. 8 illustrates a specific example of a method of adjusting style properties associated with text, according to an embodiment of the disclosure.

In an embodiment of the disclosure, an autoencoder is an artificial neural network trained in an unsupervised manner, and a generative model capable of learning an encoded representation of data and then randomly generating input data from the learned and encoded representation.

In an embodiment of the disclosure, the autoencoder may compress high-dimensional input data 812 into a low-dimensional representation vector and represent it in a latent space 814. In addition, style adjustment may be performed to extract the autoencoder coordinates in the latent space 814, and decompress the extracted coordinates into high-dimensional output data 816.

In an embodiment of the disclosure, the visualization 820 of latent vector coordinates may represent neural network features of alphabet styles.

In an embodiment of the disclosure, target handwriting 832 and reference handwriting 834 may be applied to the artificial neural network to obtain output handwriting 836 for which style adjustment is performed gradually.

In an embodiment of the disclosure, coordinates in the latent space 814 may be obtained, and high-dimensional output handwriting 836 may be obtained from the obtained coordinates in the latent space by using an allograph trace. In the latent space, coordinates of a point on a line connecting the target handwriting 832 and the reference handwriting 834 may be obtained as the output handwriting 836, and at this time, the correlation coefficient a may be adjusted to obtain the output handwriting 836. The closer the correlation coefficient a is to 1, the more similar handwriting to the reference handwriting 834 may be obtained as the output handwriting 836.

Figure 9:
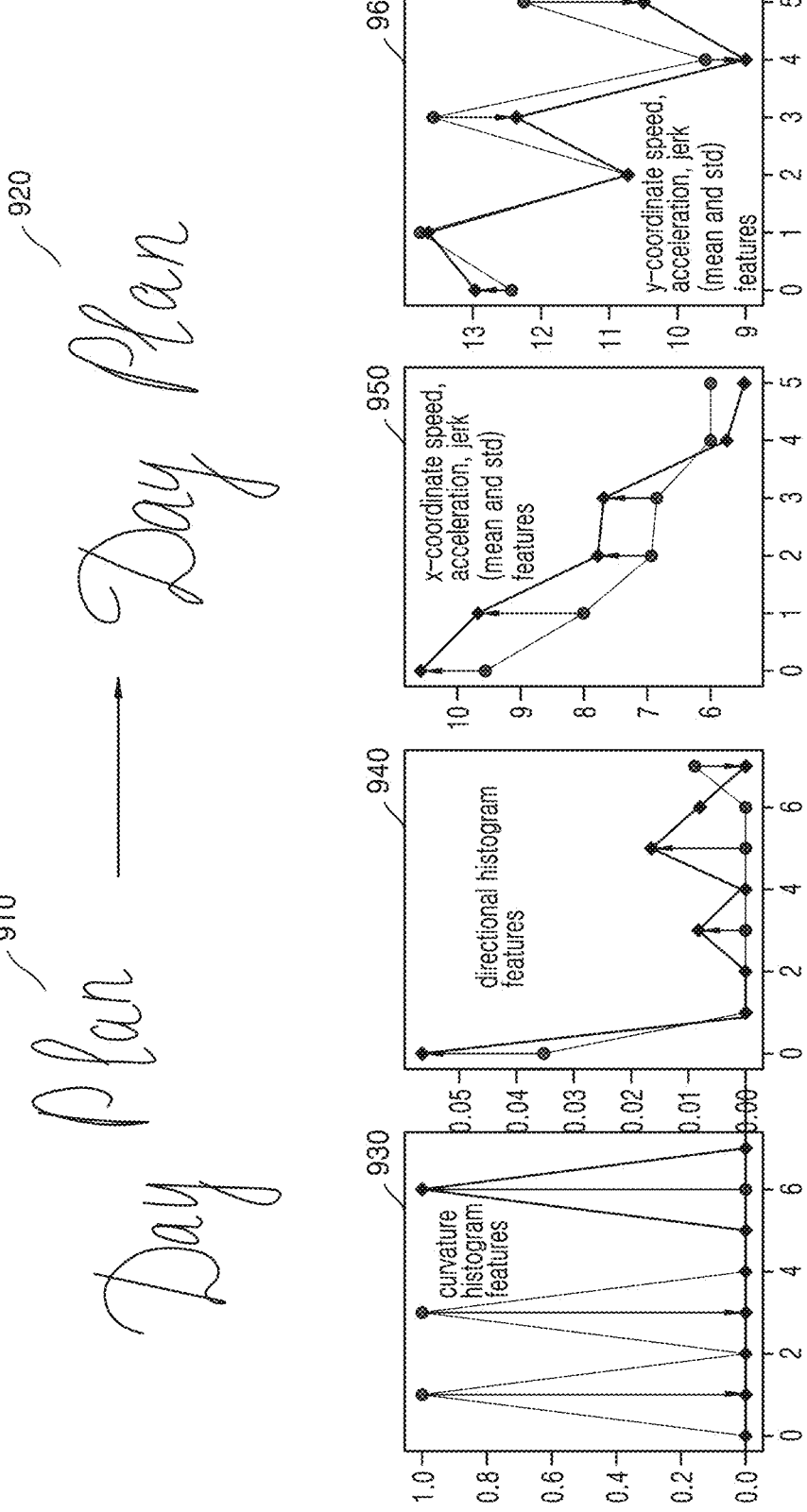
FIG. 9 illustrates a specific example of a method of adjusting style properties associated with text, according to an embodiment of the disclosure.

FIG. 9 illustrates a specific example of a method of adjusting style properties associated with text, according to an embodiment of the disclosure.

In an embodiment of the disclosure, target handwriting 910 may be adjusted based on reference handwriting 920 and displayed. Referring to FIG. 9, handwriting characteristics having geometric features may be represented as coordinates. Also, by adjusting the coordinates, the handwriting characteristics with the geometric features may be adjusted.

In an embodiment of the disclosure, handwriting characteristics having geometric features may include a handwriting curvature 930, a handwriting direction 940, characteristics 950 associated with an x-coordinate of handwriting, and characteristics 960 associated with a y-coordinate of the handwriting. Characteristics associated with coordinates may include velocity, acceleration, mean, standard deviation, etc.

Moreover, the adjustment method may be performed for all style properties associated with geometric features, and the adjustment method are not necessarily applied only to style properties associated with text.

FIG. 10 illustrates a method of resetting adjustable style properties in relation to adjustment of style properties, according to an embodiment of the disclosure.

In an embodiment of the disclosure, for an adjustable style property, when the electronic device obtains a resetting external input for resetting the document style for the target document, the electronic device may provide the adjusted target document with a different document style even if there is no change in a document style adjustment level because there is no change in a position of a scroll on a slider.

In an embodiment of the disclosure, the electronic device may reset the document style for the target document based on receiving a resetting external input. The receiving the resetting external input does not change the first document style adjustment level.

In an embodiment of the disclosure, the resetting external input may include a first resetting external input 1014, a second resetting external input 1024, and a third resetting external input 1034. For example, a reset function may be provided when a value is randomly selected from neighboring values of the style property for a style reference document.

In an embodiment of the disclosure, when the electronic device provides a first document style 1012, the electronic device may obtain a first resetting external input 1014 for resetting a document style. When obtaining the first resetting external input 1014, the electronic device may provide a new document style that is a second document style 1022 or a third document style 1032. Furthermore, after providing the new document style, a second resetting external input 1024 or a third resetting external input 1034 for resetting the document style again may be obtained.

In an embodiment of the disclosure, the first document style 1012, the second document style 1022, and the third document style 1032 may have different handwriting, text colors, background pattern arrangements, background pattern color combinations, underline accent shapes, etc. That is, by using the reset function, different document styles may be provided even at the same adjustment level.

Figure 11:
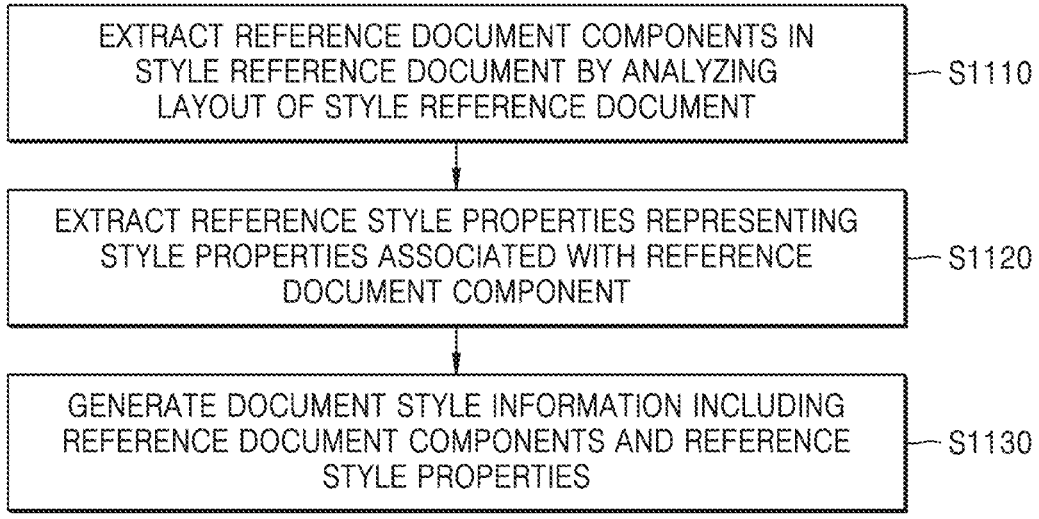
FIG. 11 illustrates a specific method of extracting document style information, according to an embodiment of the disclosure.

FIG. 11 illustrates a specific method of extracting document style information, according to an embodiment of the disclosure.

In operation S1110, the electronic device may extract document components in a style reference document by analyzing a document layout for the style reference document.

In an embodiment of the disclosure, the electronic device may analyze a layout of the style reference document and extract document components in the style reference document. The electronic device may extract, as document components in the style reference document, text, images, charts, diagrams, backgrounds, etc.

In operation S1120, the electronic device may extract style properties representing design features for the document components in the style reference document.

In an embodiment of the disclosure, the electronic device may extract style properties representing design features for the document components extracted in operation S1110. For example, when a text is extracted as a document component and the text is identified as printed text, the electronic device may extract data obtained by analyzing a text font, a text size, a text color, etc. Furthermore, when a chart is extracted as a document component, the electronic device may extract data obtained by analyzing a type of the chart, colors or textures of elements included in the chart, a caption style for the chart, and a style of a line included in the chart (e.g., a line color, width, dash, etc.). However, the document components and style properties associated therewith are not limited thereto.

In operation S1130, the electronic device may generate document style information including the document components in the style reference document and the reference style properties.

In an embodiment of the disclosure, the electronic device may generate document style information having information about the document components and the reference style properties respectively extracted in operations S1110 and S1120. Extracting the document style information may include extracting the generated information.

Figure 12A:
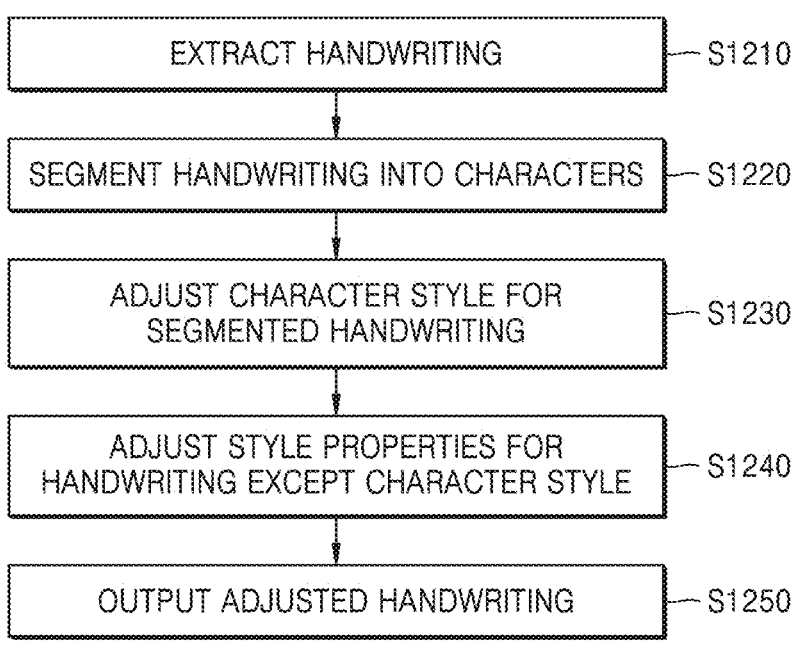
FIG. 12A illustrates a specific method of adjusting style properties for handwriting, according to an embodiment of the disclosure.

FIG. 12A illustrates a specific method of adjusting style properties for handwriting, according to an embodiment of the disclosure.

In operation S1210, the electronic device may extract handwriting.

In an embodiment of the disclosure, the electronic device may analyze a layout of a document to identify a handwritten text. In detail, the electronic device may extract a text from the document, and when the text is not a printed text, the text may be identified as a handwritten text.

In operation S1220, the electronic device may segment the handwriting into characters.

In an embodiment of the disclosure, the electronic device may segment the extracted handwriting into characters. For example, for a word "Switzerland", the word may be split into S, w, i, t, z, e, r, l, a, n, and d, respectively.

In operation S1230, the electronic device may adjust a character style for the segmented handwriting.

In an embodiment of the disclosure, the electronic device may adjust the character style for the segmented handwriting in various ways. For example, character style adjustment may be performed through allograph tracking using DTW, handwriting adjustment may be performed using a neural network, and a character style for the handwriting may be adjusted using a geometric approach.

In operation S1240, the electronic device may adjust style properties for the handwriting, other than the character style for the handwriting.

In an embodiment of the disclosure, the electronic device may adjust style properties associated with the handwriting, in addition to the style of the characters themselves in the handwriting. For example, it is possible to adjust characteristics for a slope of the handwriting, underline accent shape for the handwriting, doodles included in the handwriting, etc. In addition, the style properties associated with the handwriting, other than the style of the characters themselves in the handwriting, may be adjusted by using a geometric approach or a neural network. However, the style properties associated with the handwriting are not limited thereto.

In operation S1250, the electronic device may output adjusted handwriting.

In an embodiment of the disclosure, the electronic device may incorporate the handwriting character style and other style properties to output adjusted handwriting.

Figure 12B:
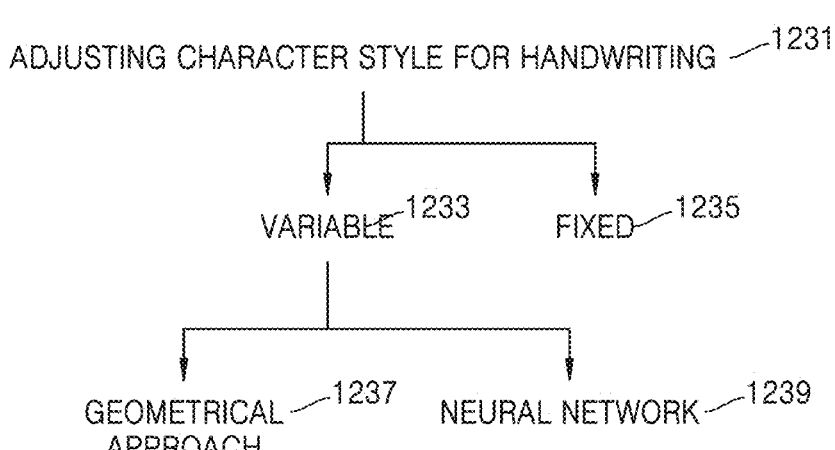
FIG. 12B illustrates a specific method of adjusting style properties of handwriting, according to an embodiment of the disclosure.

FIG. 12B illustrates a specific method of adjusting style properties for handwriting, according to an embodiment of the disclosure.

In an embodiment of the disclosure, the electronic device may adjust a character style for the segmented handwriting. There are also various methods for adjusting the character style for the handwriting (1231). For example, for adjustment of the handwriting character style, only one fixed handwriting style 1235 may be output based on reference handwriting.

In an embodiment of the disclosure, an adjustment level may be obtained via an external input signal to provide a plurality of adjustable variable handwriting styles 1233 corresponding to the adjustment level. The variable handwriting styles 1233 are handwriting styles created based on target handwriting and reference handwriting, and may be used to output handwriting that is an appropriate combination of the target handwriting and the reference handwriting.

In an embodiment of the disclosure, the variable handwriting styles 1233 may be used to perform handwriting adjustment 1237 using a geometric approach or handwriting adjustment 1239 using a neural network. The handwriting adjustment 1237 using the geometric approach may be performed through allograph tracking using DTW. The handwriting adjustment 1239 using the neural network may be performed through an allograph representation using a latent space.

Figure 13:
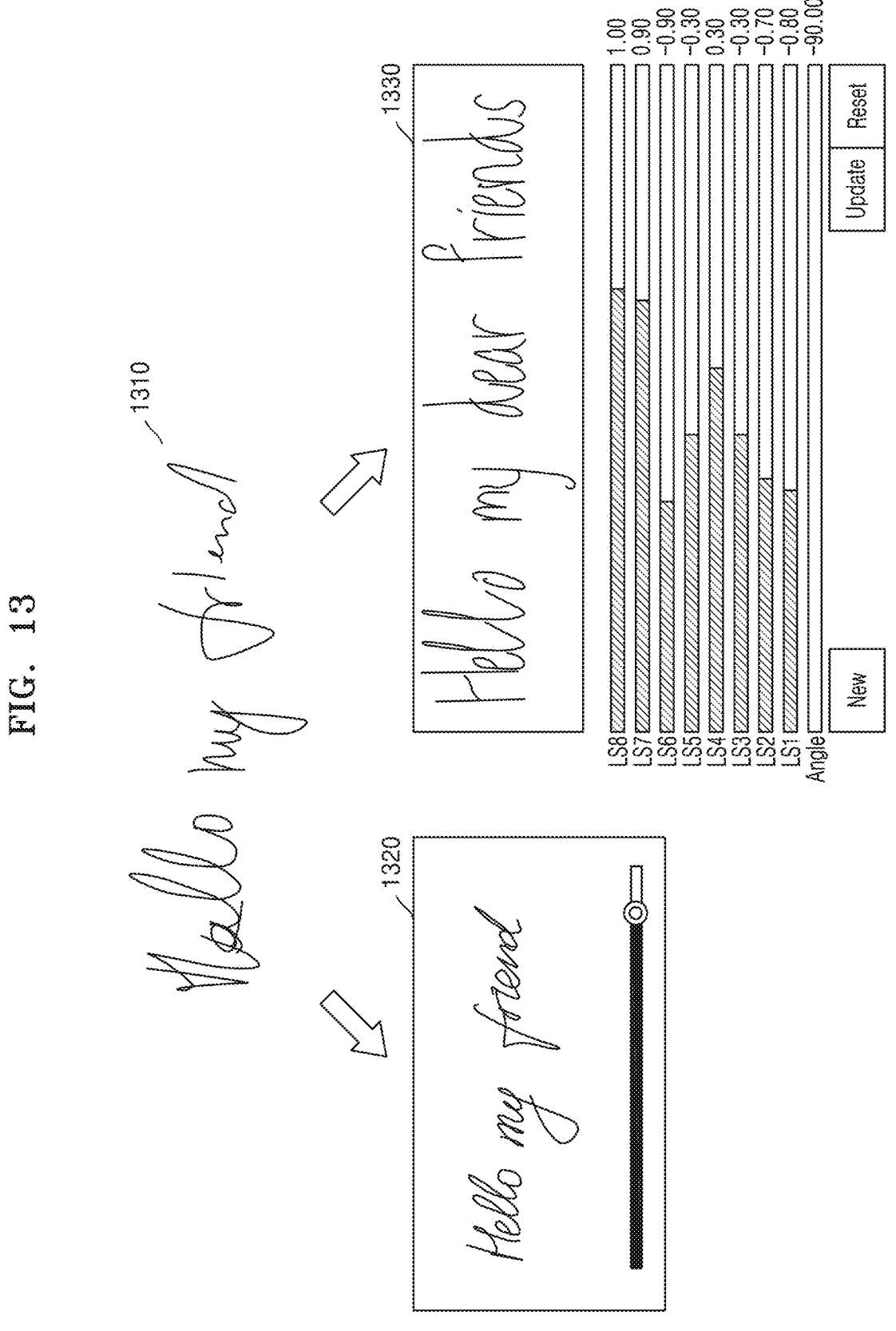
FIG. 13 illustrates a method of individually adjusting a plurality of style properties for handwriting, according to an embodiment of the disclosure.

FIG. 13 illustrates a method of individually adjusting a plurality of style properties, according to an embodiment of the disclosure.

In an embodiment of the disclosure, handwriting of some text contained in an input target document may be referred to as input handwriting 1310.

In an embodiment of the disclosure, to adjust a document component, style adjustment 1320 may be performed using one slider, based on an external input. Furthermore, style adjustment 1330 may be performed using a plurality of sliders, based on an external input. When the style adjustment 1330 is performed using the plurality of sliders, a plurality of style properties corresponding to the plurality of sliders may be individually adjusted.

In an embodiment of the disclosure, a plurality of sliders may be used to obtain an external input signal indicating an adjustment level corresponding to each component of the target document components, or an adjustment level corresponding to an adjustable style property of each component of the target document components. In addition, a single slider may be used to obtain an external input signal indicating an overall adjustment level corresponding to general adjustments to a style of the target document. In other words, one or more sliders may be used to obtain an external input signal indicating at least one of an adjustment level for each component, an adjustment level for each style property, or an overall adjustment level. The external input signal may be a first external input signal indicating a first document style adjustment level of the target document or a second external input signal indicating a second document style adjustment level of the target document.

In an embodiment of the disclosure, a plurality of sliders may each be a tool for adjusting other properties associated with a text, such as a text color, a text slope, a text size, etc.

Figure 14:
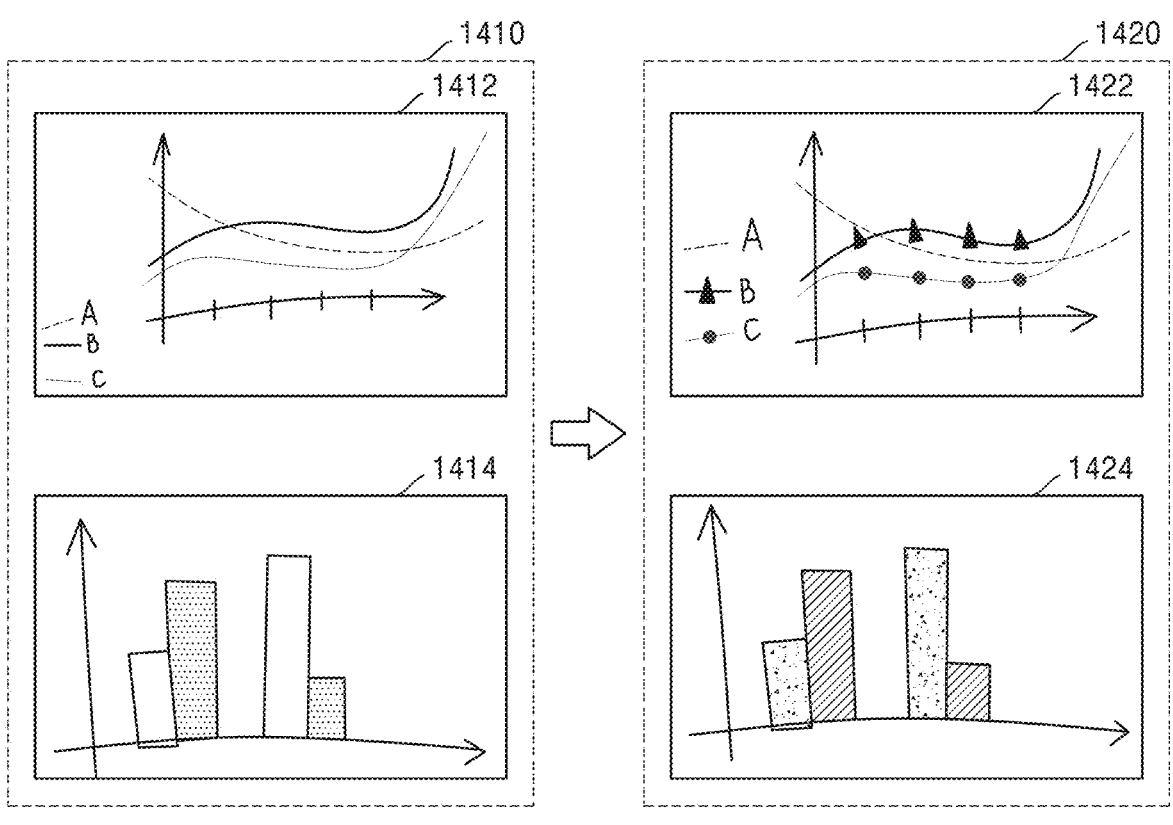
FIG. 14 illustrates a specific method of adjusting a style of a chart, according to an embodiment of the disclosure.

FIG. 14 illustrates a specific method of adjusting a style of a chart, according to an embodiment of the disclosure.

In an embodiment of the disclosure, a style 1410 of charts included in a target document may be adjusted based on charts included in a style reference document.

In an embodiment of the disclosure, the target document may include a first target chart 1412 and a second target chart 1414. The first target chart 1412 may express three functions by using different colors. The second target chart 1414 may express the same characteristics in a bar graph with the same colors.

In an embodiment of the disclosure, the style reference document may include a first reference chart and a second reference chart. A first function included in the first reference chart may be distinguished from other functions by including triangular figures at regular intervals, and a second function may be distinguished from other functions by including circles at regular intervals. The second reference chart is a bar graph, and may express the same characteristics with the same patterns inside bars. For example, the second reference chart may include a first bar and a second bar, wherein the first bar may include a polka dot pattern, and the second bar may include a comb pattern.

In an embodiment of the disclosure, the style 1410 of a chart included in the target document may be adjusted based on a chart in the style reference document. For example, a first adjustment chart 1422 may be obtained by adjusting the first target chart 1412 based on the first reference chart. Also, a second adjustment chart 1424 may be obtained by adjusting the second target chart 1414 based on the second reference chart.

In an embodiment of the disclosure, the first adjustment chart 1422 may be generated by combining properties of the first reference chart with properties of the first target chart 1412. For example, to distinguish a plurality of functions from each other, different functions may be expressed by using different colors and arranging different figures at regular intervals. The second adjustment chart 1424 may be generated by combining properties of the second reference chart with properties of the second target chart 1414. For example, characteristics may be differentiated by adjusting a color and a pattern of the bars.

Figure 15:
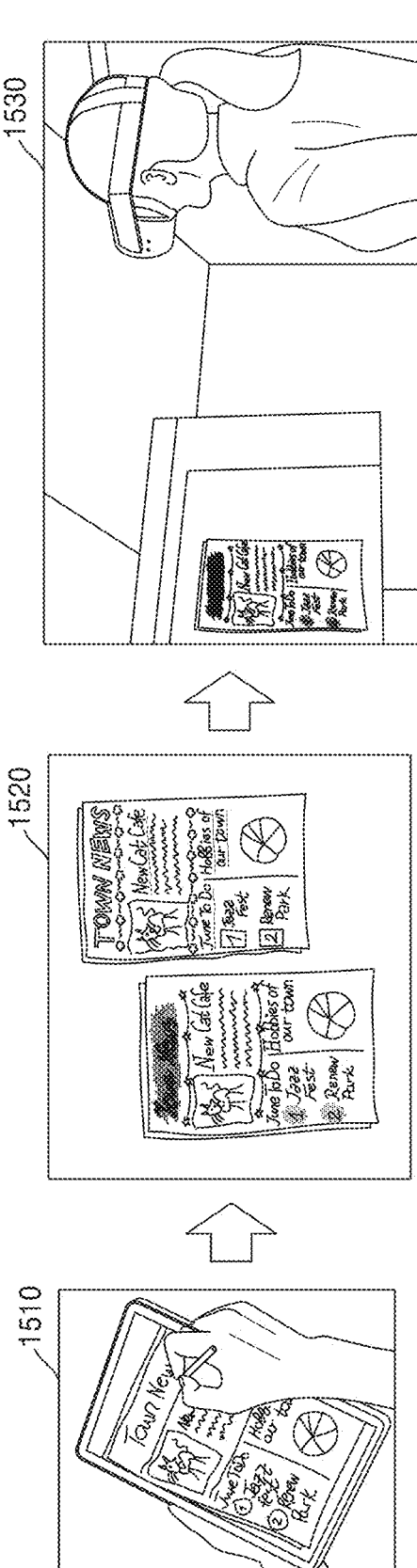
FIG. 15 illustrates a method of displaying a document with the adjusted style in augmented reality or virtual reality, according to an embodiment of the disclosure.

FIG. 15 illustrates a method of displaying a document with the adjusted style in augmented reality (AR) or virtual reality (VR), according to an embodiment of the disclosure.

In an embodiment of the disclosure, the electronic device may obtain a target document 1510. Also, by adjusting a style of the target document 1510 based on a style reference document obtained using various methods, a target document 1520 with the adjusted style may be obtained. The target document 1520 with the adjusted style may be displayed on a display of the electronic device, but may also be displayed using AR or VR technology.

In an embodiment of the disclosure, the target document 1520 may be displayed using AR (1530). For example, the target document 1520 with the adjusted style may be displayed via AR glasses. Using AR, the target document 1520 with the adjusted style may be converted into three-dimensional (3D) content and provided. By providing the target document 1520 as AR content, animation visual effects may be additionally expressed.

Figure 16:
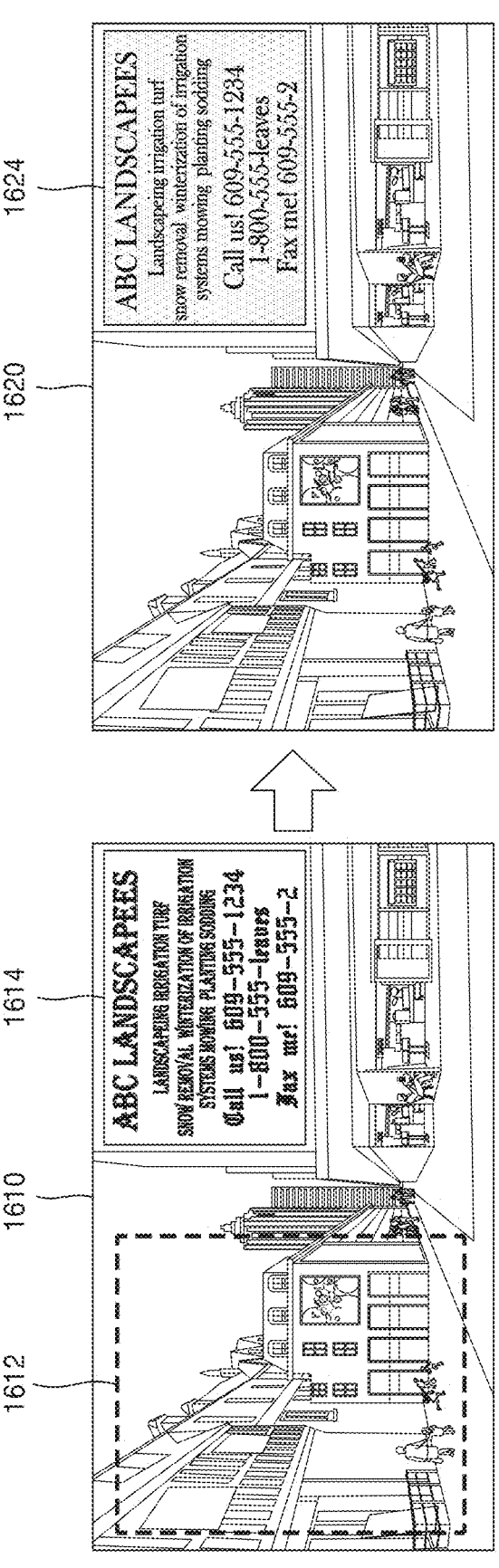
FIG. 16 illustrates an example of performing a style adjustment on a portion of a document, according to an embodiment of the disclosure.

FIG. 16 illustrates an example of performing a style adjustment on a portion of a document, according to an embodiment of the disclosure.

In an embodiment of the disclosure, the electronic device may obtain the same document as a target document and a style reference document. For example, document style information may be extracted from the entire or a part of a style reference document, and a document style may be adjusted for a part of a target document.

In an embodiment of the disclosure, a first region 1612 that is a part of an input document 1610 may be obtained as a style reference document. Also, a second region 1614 that does not overlap the first region 1612 may be obtained as a target document. Document style information representing a document style may be extracted from the first region 1612 for use in adjusting a style of the second region 1614, and the style of the second region 1614 may be adjusted based on the document style information and a first external input signal indicating a style adjustment level.

In an embodiment of the disclosure, only a style-adjusted region 1624 may be displayed, or an adjusted input document 1620 including the style-adjusted region 1624 may be displayed. In detail, data about style properties associated with text provided with an image similar to that of the first region 1612 may be obtained from style metadata to adjust a style of text included in the second region 1614. In addition, although not explicitly shown in FIG. 16, an image of a building similar to that of the first region 1612 may be included in the style-adjusted region 1624.

Figure 17:
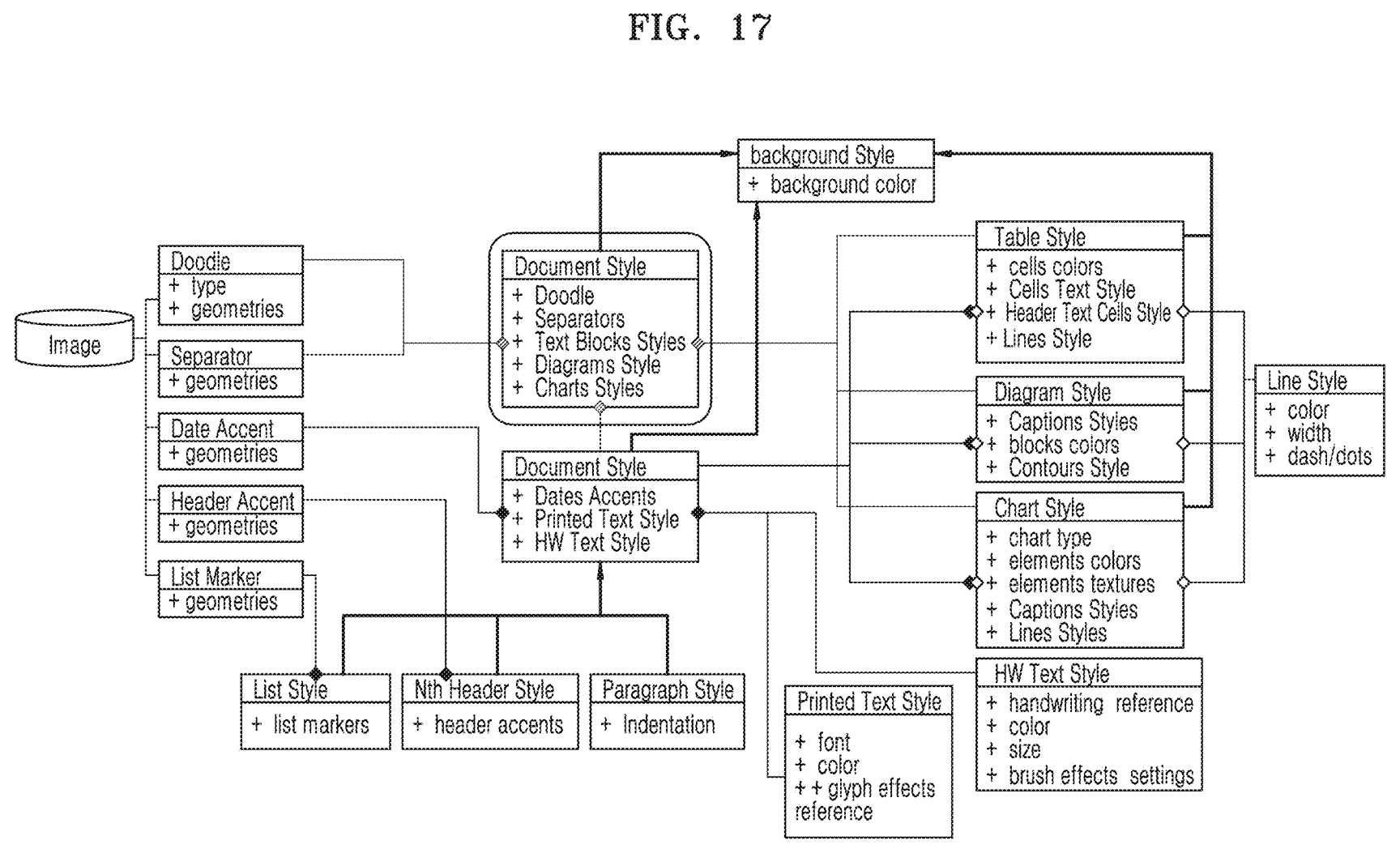

FIG. 17 is a structure diagram for document components and style properties associated therewith, according to an embodiment of the disclosure.

In an embodiment of the disclosure, document components may include text, a background, a diagram, a chart, a table, an image, etc. A document component may contain information about style properties, and sub-style properties may exist for each style property. In addition, various style properties may be linked. For example, a table, a chart, a diagram, etc. usually contain text, so they may be associated with style properties for the text.

In an embodiment of the disclosure, the text may include list information, header information, etc., and may also include information about whether the text is in a printed text style or a handwritten text style. Style properties for a printed text may include data about a font, a color, a size, and a glyph effect. Style properties for a handwritten text may include data about a handwriting style, a color, a size, brush effects, etc.

In an embodiment of the disclosure, the document style may include a list style, an N-th header style and a paragraph style. The list style may include list markers, etc. The Nth header style may include header accents, etc. The paragraph style may include indentation, etc.

In an embodiment of the disclosure, a chart may include data about a chart type, colors of chart elements, caption styles for the chart, and line styles for the chart. A diagram may include data about caption styles for the diagram, colors of the diagram, etc. A table may include data about a style of text within cells, colors of the cells, colors of lines, etc. A background may include data about a background color, doodles included in the background, etc. Charts, tables, diagrams, etc. may include lines, and information about a color of a line, a width of the line, dashes on the line, etc. may be organically connected.

Moreover, this is merely an example, and structured information about document components and style properties may vary.

Figure 18:
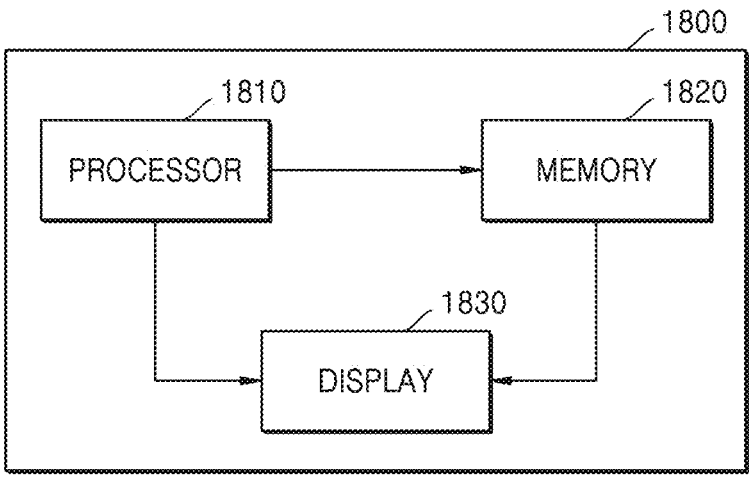
FIG. 18 is a block diagram of a device for performing a method of adjusting a style of a document, according to an embodiment of the disclosure.

FIG. 18 is a block diagram of a device for performing a method of adjusting a style of a document, according to an embodiment of the disclosure.

In an embodiment of the disclosure, the electronic device may include at least one processor 1810 (hereinafter referred to as a processor), a memory 1820 for storing one or more instructions (hereinafter referred to as a memory), and one or more displays 1830 (hereinafter referred to as a display). Additionally, although not shown in FIG. 18, the electronic device may further include at least one camera.

In an embodiment of the disclosure, the processor 1810 may include at least one of a central processing unit (CPU), a graphics processing unit (GPU), or a video processing unit (VPU). Alternatively, according to an embodiment of the disclosure, the processor 1810 may be implemented in the form of a system on chip (SoC) in which at least one of a CPU, a GPU, or a VPU is integrated. Alternatively, the processor 1810 may further include a neural processing unit (NPU).

In an embodiment of the disclosure, the processor 1810 may perform document style adjustment. To perform style adjustment, the processor 1810 may obtain a style reference document, obtain a target document from a user, extract, from the style reference document, document style information representing a document style for the style reference document for use in adjusting a document style for the target document, and adjust the document style for the target document, based on the document style information and a first external input signal.

In an embodiment of the disclosure, the processor 1810 may obtain a style reference document to refer to for adjusting a document style for a target document. The style reference document may be one or a plurality of documents selected based on an external input, may be obtained from the user, may be a document prestored in the electronic device, or may be obtained via a server. A method of obtaining the style reference document is not limited thereto. In addition, only a part of the style reference document may be considered and used to adjust the style of the target document. The style reference document may be selected based on an external input.

In an embodiment of the disclosure, the processor 1810 may obtain the target document. The user may scan a document, capture an image, or input a document in digital form to the electronic device.

In an embodiment of the disclosure, the processor 1810 extracts, from the style reference document, document style information including reference document components and reference style properties. By analyzing a layout of the style reference document and recognizing document components therein, the processor 1810 may extract document style information including reference document components and reference style properties. In this case, the document style information may include style metadata or extended style metadata associated with reference document components or reference style properties. The document style information may be obtained or extracted using a rule-based method or machine learning.

In an embodiment of the disclosure, the processor 1810 may adjust the document style for the target document, based on the document style information and a first external input signal indicating a document style adjustment level, and in an embodiment of the disclosure, the first external input signal may be a user's touch input via the display 1830 or a voice command. The document style adjustment may be performed by comprehensively considering target document components, target style properties, and the document style information. Furthermore, even when a reference document component corresponding to a target document component does not exist in the style reference document, the adjustment may be performed by appropriately taking into account other style properties for the style reference document. In addition, the style adjustment may be performed collectively for components in the target document and style properties associated therewith, or individually for each target document component or each target style property.

In an embodiment of the disclosure, the processor 1810 may obtain an external input signal for readjusting the document style or an external input signal for resetting the document style. The external input signal for readjusting the document style may mean an external input signal for having different style adjustment levels, and the external input signal for resetting the document style may mean an external input signal for providing different document styles at the same style adjustment level.

In an embodiment of the disclosure, the processor 1810 may perform the document style adjustment by using a neural network, a clustering algorithm, and a geometric approach, and also perform the document style adjustment based on a rule-based method or machine learning.

In an embodiment of the disclosure, the memory 1820 may store various pieces of data, programs, or applications for driving and controlling the electronic device. A program stored in memory 1820 may include one or more instructions. A program (one or more instructions) or application stored in the memory 1820 may be executed by the processor 1810.

In an embodiment of the disclosure, the display 1830 may display the adjusted target document with the adjusted document style on the display 1830. Also, the adjusted target document may be provided on the display 1830 as AR/VR content.

According to an embodiment of the disclosure, a method of adjusting a document style is provided. The method of adjusting the document style may include obtaining a style reference document. In an embodiment of the disclosure, the method of adjusting the document style may include obtaining a target document from a user. In an embodiment of the disclosure, the method of adjusting the document style may include extracting, from the style reference document, document style information representing a document style for the style reference document. In an embodiment of the disclosure, the method of adjusting the document style may include adjusting a document style for the target document, based on the document style information and a first external input signal indicating a document style adjustment level for the target document, and displaying the target document with the adjusted document style.

According to an embodiment of the disclosure, the method of adjusting the document style may include adjusting the document style for the target document, based on the document style information and a second external input signal indicating a document style adjustment level for the target document. In an embodiment of the disclosure, the document style adjustment level included in the second external input signal may be different from the document style adjustment level included in the first external input signal.

According to an embodiment of the disclosure, the method of adjusting the document style may include selecting a document from among one or more documents.

According to an embodiment of the disclosure, the method of adjusting the document style may include extracting reference document components representing document components in the style reference document by analyzing a layout of the style reference document. In an embodiment of the disclosure, the method of adjusting the document style may include extracting reference style properties representing design features associated with the reference document components. In an embodiment of the disclosure, the method of adjusting the document style may include generating document style information including the reference document component and the reference style properties.

According to an embodiment of the disclosure, the method of adjusting the document style may include extracting target document components representing document components included in the target document by analyzing the target document. In an embodiment of the disclosure, the method of adjusting the document style may include extracting target style properties representing design features associated with the target document components. In an embodiment of the disclosure, the method of adjusting the document style may include adjusting the document style for the target document, based on the document style information, the target document components, the target style properties, and the first external input signal.

According to an embodiment of the disclosure, a document style adjustment level may include at least one of an adjustment level for each component, corresponding to a target document component, an adjustment level for each style property, corresponding to an adjustable style property for the target document component, or an overall adjustment level for generally adjusting the style of the target document.

According to an embodiment of the disclosure, the method of adjusting the document style may be performed based on a rule-based method or machine learning.

According to an embodiment of the disclosure, the method of adjusting the document style may include selecting a plurality of documents from among the one or more documents.

According to an embodiment of the disclosure, the method of adjusting the document style may further include resetting a document style for the target document based on an resetting external input for resetting the document style for the target document. In an embodiment of the disclosure, via the resetting external input for resetting the document style for the target document, the electronic device may provide a different document styles even at the same document style adjustment level. The resetting external input may be for providing a different document style even if there is no change in the document style adjustment level.

According to an embodiment of the disclosure, the method of adjusting the document style may include extracting the document style information from the entire or a part of the style reference document.

According to an embodiment of the disclosure, the method of adjusting the document style may include adjusting the document style for the target document by using at least one of a neural network, a clustering algorithm, or a geometric approach.

According to an embodiment of the disclosure, the target document with the adjusted document style may be AR content or VR content.

According to an embodiment of the disclosure, an electronic device for adjusting a document style may include one or more displays, a memory storing one or more instructions, and at least one processor configured to execute the one or more instructions stored in the memory. The at least one processor may execute the one or more instructions stored in the memory to obtain a style reference document. Meanwhile, for convenience of description, operations performed by the at least one processor executing the one or more instructions stored in the memory may be referred as being performed by the at least one processor. In an embodiment of the disclosure, the at least one processor may obtain a target document from a user. In an embodiment of the disclosure, the at least one processor may extract, from the style reference document, document style information representing a document style for the style reference document for use in adjusting the style of the target document. In an embodiment of the disclosure, the at least one processor may adjust a document style for the target document, based on the document style information and a first external input signal indicating a document style adjustment level for the target document based on the document style information, and display the adjusted target document with the adjusted document style.

According to an embodiment of the disclosure, the at least one processor may adjust again the document style for the adjusted target document, based on the document style information and a second external input signal indicating a document style adjustment level for the target document based on the document style information. In an embodiment of the disclosure, the document style adjustment level of second external input signal may be different from the document style adjustment level of the first external input signal.

According to an embodiment of the disclosure, the at least one processor may select a document from among one or more documents.

According to an embodiment of the disclosure, the at least one processor may extract reference document components representing document components in the style reference document by analyzing a layout of the style reference document. In an embodiment of the disclosure, the at least one processor may extract reference style properties representing design features associated with the reference document components. According to an embodiment of the disclosure, the at least one processor may extract document style information by generating the document style information including the reference document components and the reference style properties.

According to an embodiment of the disclosure, the at least one processor may extract target document components representing document components included in the target document by analyzing the target document. According to an embodiment of the disclosure, the at least one processor may extract target style properties representing design features associated with the target document components. According to an embodiment of the disclosure, the at least one processor may adjust the document style for the target document, based on the document style information, the target document components, the target style properties, and the first external input signal.

According to an embodiment of the disclosure, the at least one processor may extract the document style information based on a rule-based method or machine learning.

According to an embodiment of the disclosure, the at least one processor may adjust the document style for the target document by using at least one of a neural network, a clustering algorithm, or a geometric approach.

According to an embodiment of the disclosure, a computer-readable recording medium having recorded thereon a program for executing the method of adjusting the document style on a computer may be provided. The method of adjusting the document style may include obtaining a style reference document. In an embodiment of the disclosure, the method of adjusting the document style may include obtaining a target document from a user. In an embodiment of the disclosure, the method of adjusting the document style may include extracting, from the style reference document, document style information representing a document style for the style reference document. In an embodiment of the disclosure, the method of adjusting the document style may include adjusting a document style for the target document, based on the document style information and a first external input signal indicating a document style adjustment level for the target document. In an embodiment of the disclosure, the method of adjusting the document style may include displaying the target document with the adjusted document style.

The method of the disclosure may be performed by a processor, an ASIC, an FPGA, or an SoC. Furthermore, the described method may be executed by a storage medium storing instructions executable by a computer and capable of causing, when executed by the processor 1810, the computer to perform the method of the disclosure.

A computer-readable storage medium may be provided in the form of a non-transitory storage medium. In this regard, the term 'non-transitory' only means that the storage medium does not include a signal and is a tangible device, and the term does not differentiate between where data is semi-permanently stored in the storage medium and where the data is temporarily stored in the storage medium. For example, the "non-transitory storage medium" may include a buffer for temporarily storing data.

The method of the disclosure may be implemented in the form of program commands that may be performed by various types of computers, and may be recorded on computer-readable recording media. The computer-readable recording media may include program commands, data files, data structures, etc. either alone or in combination. The program commands recorded on the computer-readable recording media may be designed and configured specially for the disclosure or may be known to and be usable by those of skill in the art of computer software. Examples of the computer-readable recording media include magnetic media such as hard disks, floppy disks, and magnetic tapes, optical media such as compact disk ROM (CD-ROM) and digital versatile disks (DVDs), magneto-optical media such as floptical disks, and hardware devices that are specially configured to store and perform program commands, such as ROM, RAM, flash memory, etc. Examples of program commands include not only machine code such as that created by a compiler but also high-level language code that may be executed by a computer using an interpreter or the like.

The method of adjusting a document style according to an embodiment of the disclosure may be included in a computer program product when provided. The computer program product may be traded, as a product, between a seller and a buyer.

The computer program product may include a software program and a computer-readable storage medium having the software program stored thereon. For example, the computer program product may include a product (e.g., a downloadable application) in the form of a software program electronically distributed by a manufacturer of the electronic device or through an electronic market (e.g., Google Play Store™, and App Store™). For such electronic distribution, at least a part of the software program may be stored on the storage medium or may be temporarily generated. In this case, the storage medium may be a storage medium of a server of the manufacturer, a server of the electronic market, or a relay server for temporarily storing the software program.

In a system consisting of a server and a client device, the computer program product may include a storage medium of the server or a storage medium of the client device. Alternatively, in a case where there is a third device (e.g., a smartphone) communicatively connected to the server or client device, the computer program product may include a storage medium of the third device. Alternatively, the computer program product may include a software program itself that is transmitted from the server to the client device or the third device or that is transmitted from the third device to the client device.

In this case, one of the server, the client device, and the third device may execute the computer program product to perform methods according to embodiments of the disclosure. Alternatively, at least two of the server, the client device, and the third device may execute the computer program product to perform the methods according to the embodiments of the disclosure in a distributed manner.

For example, the server (e.g., a cloud server, an artificial intelligence (AI) server, or the like) may execute the computer program product stored therein to control the client device communicatively connected to the server to perform the methods according to the embodiments of the disclosure.

While embodiments of the disclosure have been particularly described above, the embodiments of the disclosure are not to be construed as limiting the scope of the disclosure, and various modifications and improvements made by those skilled in the art based on a basic concept of the disclosure also fall within the scope of the disclosure as defined by the following claims.

What is claimed is:

1. A method of adjusting a document style comprises:
obtaining a target document from a user;
obtaining a style reference document;
extracting, from the style reference document, document style information representing a document style of the style reference document;
adjusting a document style of the target document based on the document style information and a first external input signal indicating a first document style adjustment level of the target document, wherein the first document style adjustment level of the target document indicates a degree to which the document style of the style reference document and the document style of the target document are combined; and
displaying the target document with the adjusted document style,
wherein the adjusting the document style of the target document comprises:
extracting, from the target document, target document components representing document components included in the target document by analyzing the target document;
extracting, from the target document, target style properties representing style properties associated with the target document components; and
adjusting the document style of the target document based on the document style information, the target document components, the target style properties, and the first external input signal.

2. The method of claim 1, further comprising:
adjusting the document style of the target document based on the document style information and a second external input signal indicating a second document style adjustment level of the target document different from the first document style adjustment level.

3. The method of claim 1, wherein the obtaining the style reference document comprises selecting a document from among one or more documents.

4. The method of claim 1,
   wherein the extracting, from the style reference document, the document style information comprises:
   extracting, from the style reference document, reference document components representing document components in the style reference document by analyzing a layout of the style reference document; and
   extracting, from the style reference document, reference style properties representing style properties associated with the reference document components, and
   wherein the document style information comprises the reference document components and the reference style properties.

5. The method of claim 1, wherein the first document style adjustment level comprises at least one of an adjustment level corresponding to each component of the target document components, an adjustment level corresponding to an adjustable style property of each component of the target document components, or an overall adjustment level corresponding to general adjustments to the style of the target document.

6. The method of claim 1, wherein the extracting the document style information is performed based on a rule-based method or machine learning.

7. The method of claim 5, wherein the obtaining the style reference document comprises selecting a plurality of documents from among one or more documents.

8. The method of claim 1, further comprising:
   based on receiving a resetting external input, resetting the document style for the target document,
   wherein receiving the resetting external input does not change the first document style adjustment level.

9. The method of claim 1, wherein the extracting, from the style reference document, the document style information comprises extracting the document style information from a part of the style reference document.

10. The method of claim 1, wherein the adjusting the document style for the target document is performed by using at least one of a neural network, a clustering algorithm, or a geometric approach.

11. The method of claim 1, wherein the adjusted target document with the adjusted document style is displayed as augmented reality (AR) content or virtual reality (VR) content.

12. An electronic device comprising:
   at least one display;
   at least one memory storing at least one instruction; and
   at least one processor configured to execute the at least one instruction,
   wherein the at least one instruction, when executed by the at least one processor, causes the electronic device to:
   obtain a target document from a user,
   obtain a style reference document,
   extract, from the style reference document, document style information representing a document style of the style reference document,
   adjust a document style of the target document based on the document style information and a first external input signal indicating a first document style adjustment level of the target document, wherein the first document style adjustment level of the target document indicates a degree to which a document style of the style reference document and the document style of the target are combined, and
   display the target document with the adjusted document style, and wherein the at least one instruction, when executed by the at least one processor, further causes the electronic device to adjust the document style of the target document by:
   extracting, from the target document, target document components representing document components included in the target document by analyzing the target document,
   extracting, from the target document, target style properties representing style properties associated with the target document components, and
   adjusting the document style of the target document based on the document style information, the target document components, the target style properties, and the first external input signal.

13. The electronic device of claim 12, wherein the at least one instruction, when executed by the at least one processor, further causes the electronic device to:
   adjust the document style of the target document based on the document style information and a second external input signal indicating a second document style adjustment level of the target document different from the first document style adjustment level.

14. The electronic device of claim 12, wherein the at least one instruction, when executed by the at least one processor, further causes the electronic device to obtain the style reference document by selecting a document from among one or more documents.

15. The electronic device of claim 12, wherein the at least one instruction, when executed by the at least one processor, further causes the electronic device to extract, from the style reference document, the document style information by:
   extracting, from the style reference document, reference document components representing document components in the style reference document by analyzing a layout of the style reference document, and
   extracting, from the style reference document, reference style properties representing style properties associated with the reference document components, and
   wherein the document style information comprises the reference document components and the reference style properties.

16. The electronic device of claim 12, wherein the at least one instruction, when executed by the at least one processor, further causes the electronic device to extract the document style information using a rule-based method or machine learning.

17. The electronic device of claim 12, wherein the at least one instruction, when executed by the at least one processor, further causes the electronic device to adjust the document style of the target document using at least one of a neural network, a clustering algorithm, or a geometric approach.

18. A non-transitory computer readable medium having instructions stored therein, which when executed by at least one processor cause the at least one processor to execute a method of adjusting a document style, the method comprising:
   obtaining a target document from a user;
   obtaining a style reference document;
   extracting, from the style reference document, document style information representing a document style of the style reference document;
   adjusting a document style of the target document based on the document style information and a first external input signal indicating a first document style adjustment level of the target document, wherein the first document style adjustment level of the target document indicates a degree to which the document style of the style reference document and the document style of the target document are combined; and displaying the target document with the adjusted document style, wherein the adjusting the document style of the target document comprises:

extracting, from the target document, target document components representing document components included in the target document by analyzing the target document;

extracting, from the target document, target style properties representing style properties associated with the target document components; and adjusting the document style of the target document based on the document style information, the target document components, the target style properties, and the first external input signal.

* * * * *